US008037150B2

(12) United States Patent
Weaver et al.

(10) Patent No.: US 8,037,150 B2
(45) Date of Patent: Oct. 11, 2011

(54) SYSTEM AND METHODS FOR PROVIDING MULTIPLE PERSONAS IN A COMMUNICATIONS ENVIRONMENT

(75) Inventors: Andrew Weaver, Herndon, VA (US); Eric Jeffrey Wolf, Alexandria, VA (US); Julie McCool, Reston, VA (US); Julie Mills, Reston, VA (US); Brian Heikes, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1203 days.

(21) Appl. No.: 10/847,463

(22) Filed: May 18, 2004

(65) Prior Publication Data

US 2005/0108329 A1    May 19, 2005

Related U.S. Application Data

(63) Continuation-in-part of application No. 10/715,209, filed on Nov. 18, 2003, now Pat. No. 7,636,751.

(60) Provisional application No. 60/427,941, filed on Nov. 21, 2002, provisional application No. 60/464,106, filed on Apr. 21, 2003, provisional application No. 60/488,399, filed on Jul. 21, 2003.

(30) Foreign Application Priority Data

Nov. 18, 2003  (WO) ...................... PCT/US03/36796

(51) Int. Cl.
*G06F 15/16* (2006.01)
*H04B 7/00* (2006.01)
(52) U.S. Cl. ........ 709/207; 709/206; 709/204; 455/518; 455/519
(58) Field of Classification Search .................. 709/207, 709/204, 206; 455/518, 519
See application file for complete search history.

(56) References Cited

U.S. PATENT DOCUMENTS 4,837,798 A    6/1989   Cohen et al.
(Continued)

FOREIGN PATENT DOCUMENTS

EP          0 862 304 A2    9/1998
(Continued)

OTHER PUBLICATIONS

'Prodigy Unveils Next Generation of Instant Messaging', Business Wire, May 5, 1999.*

(Continued)

*Primary Examiner* — Tonia L. M. Dollinger
*Assistant Examiner* — Mark Fearer
(74) *Attorney, Agent, or Firm* — Finnegan, Henderson, Farabow, Garrett & Dunner LLP

(57) ABSTRACT

A user interface on a display enables perception of communications that leverage an instant messaging platform. The user interface includes a module for identifying at least two identities within an instant messaging communications environment to whom messages may be directed, a module for associating a first persona of a user with a first functionality, a module for associating a second persona of the user with a second functionality, the second functionality differing from the first functionality, a module for rendering an instant messaging application user interface for a first instant messaging communications session involving the user and a first identity and a second instant messaging communications session involving the user and a second identity, the user interface being presented at a system display presented to the user, and a module for enabling the first person of the user to be projected to the first identity while concurrently enabling a second persona of the same user to be projected to the second identity.

90 Claims, 18 Drawing Sheets

U.S. PATENT DOCUMENTS

| | | |
|---|---|---|
| 5,086,394 A | 2/1992 | Shapira |
| 5,276,905 A | 1/1994 | Hurst et al. |
| 5,327,486 A | 7/1994 | Wolff et al. |
| 5,548,637 A | 8/1996 | Heller et al. |
| 5,557,659 A | 9/1996 | Hyde-Thomson |
| 5,608,786 A | 3/1997 | Gordon |
| 5,659,692 A | 8/1997 | Poggio et al. |
| 5,694,616 A | 12/1997 | Johnson et al. |
| 5,721,906 A | 2/1998 | Siefert |
| 5,742,905 A | 4/1998 | Pepe et al. |
| 5,745,556 A | 4/1998 | Ronen |
| 5,774,670 A | 6/1998 | Montulli |
| 5,793,365 A | 8/1998 | Tang et al. |
| 5,802,470 A | 9/1998 | Gaulke et al. |
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,880,731 A | 3/1999 | Liles et al. |
| 5,893,091 A | 4/1999 | Hunt et al. |
| 5,893,099 A | 4/1999 | Schreiber et al. |
| 5,894,305 A | 4/1999 | Needham |
| 5,920,692 A | 7/1999 | Nguyen et al. |
| 5,940,488 A | 8/1999 | DeGrazia et al. |
| 5,944,780 A | 8/1999 | Chase et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,963,217 A | 10/1999 | Grayson et al. |
| 5,987,113 A | 11/1999 | James |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,134,432 A | 10/2000 | Holmes et al. |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,192,396 B1 | 2/2001 | Kohler |
| 6,199,103 B1 | 3/2001 | Sakaguchi et al. |
| 6,212,550 B1 | 4/2001 | Segur |
| 6,247,043 B1 | 6/2001 | Bates et al. |
| 6,248,946 B1 | 6/2001 | Dwek |
| 6,249,740 B1 | 6/2001 | Ito et al. |
| 6,252,588 B1 | 6/2001 | Dawson |
| 6,252,952 B1 | 6/2001 | Kung et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw et al. |
| 6,314,450 B1 | 11/2001 | Hachiya et al. |
| 6,324,541 B1 | 11/2001 | de l'Etraz et al. |
| 6,324,569 B1 | 11/2001 | Ogilvie et al. |
| 6,330,590 B1 | 12/2001 | Cotton |
| 6,346,952 B1 | 2/2002 | Shtivelman |
| 6,347,332 B1 | 2/2002 | Malet et al. |
| 6,351,698 B1 | 2/2002 | Kubota et al. |
| 6,363,392 B1 | 3/2002 | Halstead et al. |
| 6,373,817 B1 | 4/2002 | Kung et al. |
| 6,374,246 B1 | 4/2002 | Matsuo |
| 6,374,290 B1 | 4/2002 | Scharber et al. |
| 6,389,028 B1 | 5/2002 | Bondarenko et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,434,599 B1 | 8/2002 | Porter |
| 6,446,112 B1 | 9/2002 | Bunney et al. |
| 6,449,344 B1 | 9/2002 | Goldfinger et al. |
| 6,449,634 B1 | 9/2002 | Capiel |
| 6,453,294 B1 | 9/2002 | Dutta et al. |
| 6,480,885 B1 | 11/2002 | Olivier |
| 6,484,196 B1 | 11/2002 | Maurille |
| 6,487,584 B1 | 11/2002 | Bunney |
| 6,501,834 B1 | 12/2002 | Milewski et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,542,750 B2 | 4/2003 | Hendrey et al. |
| 6,549,937 B1 | 4/2003 | Auerbach et al. |
| 6,557,027 B1 | 4/2003 | Cragun |
| 6,559,863 B1 | 5/2003 | Megiddo |
| 6,571,234 B1 | 5/2003 | Knight et al. |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,230 B1 | 10/2003 | Doss et al. |
| 6,654,683 B2 | 11/2003 | Jin et al. |
| 6,671,682 B1 | 12/2003 | Nolte et al. |
| 6,677,968 B1 | 1/2004 | Appelman |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang et al. |
| 6,732,155 B2 | 5/2004 | Meek |
| 6,750,881 B1 | 6/2004 | Appelman |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,799,039 B2 | 9/2004 | Wu et al. |
| 6,800,031 B2 | 10/2004 | Di Cesare |
| 6,832,245 B1 | 12/2004 | Isaacs et al. |
| 6,839,737 B1 | 1/2005 | Friskel |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,941,345 B1 | 9/2005 | Kapil et al. |
| 6,968,179 B1 | 11/2005 | DeVries |
| 6,976,092 B1 | 12/2005 | Daniell et al. |
| 6,981,223 B2 | 12/2005 | Becker et al. |
| 6,993,564 B2 | 1/2006 | Whitten, II |
| 7,035,803 B1 | 4/2006 | Ostermann et al. |
| 7,035,865 B2 | 4/2006 | Doss et al. |
| 7,039,639 B2 | 5/2006 | Brezin et al. |
| 7,058,036 B1 | 6/2006 | Yu et al. |
| 7,058,690 B2 | 6/2006 | Maehiro |
| 7,082,047 B2 | 7/2006 | Chow |
| 7,117,254 B2 | 10/2006 | Lunt et al. |
| 7,124,123 B1 | 10/2006 | Roskind et al. |
| 7,127,232 B2 | 10/2006 | O'Neil et al. |
| 7,177,880 B2 | 2/2007 | Ruvolo |
| 7,181,441 B2 | 2/2007 | Mandato et al. |
| 7,181,498 B2 | 2/2007 | Zhu et al. |
| 7,185,059 B2 | 2/2007 | Daniell et al. |
| 7,188,153 B2 | 3/2007 | Lunt et al. |
| 7,190,956 B2 | 3/2007 | Dorenbosch et al. |
| 7,200,634 B2 | 4/2007 | Mendiola et al. |

| | | |
|---|---|---|
| 7,202,814 B2 | 4/2007 | Caspi et al. |
| 7,222,156 B2 | 5/2007 | Gupta et al. |
| 7,269,590 B2 | 9/2007 | Hull et al. |
| 7,275,215 B2 | 9/2007 | Werndorfer et al. |
| 7,313,760 B2 | 12/2007 | Grossman et al. |
| 7,436,780 B2 | 10/2008 | Stephens et al. |
| 7,596,599 B1* | 9/2009 | Maghsoodnia et al. ...... 709/206 |
| 2001/0005861 A1 | 6/2001 | Mousseau et al. |
| 2001/0013050 A1 | 8/2001 | Shah |
| 2001/0030664 A1 | 10/2001 | Shulman et al. |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0059425 A1 | 5/2002 | Belfiore et al. |
| 2002/0065856 A1 | 5/2002 | Kisiel |
| 2002/0065894 A1 | 5/2002 | Dalal et al. |
| 2002/0077080 A1 | 6/2002 | Greene |
| 2002/0078150 A1* | 6/2002 | Thompson et al. ............ 709/204 |
| 2002/0078153 A1 | 6/2002 | Chung et al. |
| 2002/0083136 A1 | 6/2002 | Whitten, II |
| 2002/0091667 A1 | 7/2002 | Jaipuria et al. |
| 2002/0103801 A1 | 8/2002 | Lyons |
| 2002/0112181 A1 | 8/2002 | Smith |
| 2002/0113820 A1 | 8/2002 | Robinson et al. |
| 2002/0116463 A1 | 8/2002 | Hart |
| 2002/0116641 A1 | 8/2002 | Mastrianni |
| 2002/0119789 A1 | 8/2002 | Friedman |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0065721 A1 | 4/2003 | Roskind |
| 2003/0084103 A1 | 5/2003 | Weiner et al. |
| 2003/0093580 A1 | 5/2003 | Thomas et al. |
| 2003/0101226 A1 | 5/2003 | Quine |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2004/0015548 A1 | 1/2004 | Lee |
| 2004/0054729 A1 | 3/2004 | Fukuizumi et al. |
| 2004/0054736 A1 | 3/2004 | Daniell et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128353 A1* | 7/2004 | Goodman et al. ............ 709/204 |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0201624 A1 | 10/2004 | Crawford |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0055416 A1 | 3/2005 | Heikes et al. |
| 2005/0060377 A1 | 3/2005 | Lo et al. |
| 2005/0076241 A1 | 4/2005 | Appelman |
| 2005/0080859 A1 | 4/2005 | Lake |
| 2005/0080863 A1 | 4/2005 | Daniell |
| 2005/0080867 A1* | 4/2005 | Malik et al. .................. 709/207 |
| 2005/0080868 A1* | 4/2005 | Malik ........................... 709/207 |
| 2005/0086211 A1 | 4/2005 | Mayer |
| 2005/0091311 A1 | 4/2005 | Lund et al. |
| 2005/0114229 A1 | 5/2005 | Ackley et al. |
| 2005/0153681 A1 | 7/2005 | Hanson |
| 2005/0171799 A1 | 8/2005 | Hull et al. |
| 2005/0197846 A1 | 9/2005 | Pezaris |
| 2005/0216300 A1 | 9/2005 | Appelman et al. |
| 2005/0246420 A1 | 11/2005 | Little |
| 2006/0075044 A1 | 4/2006 | Fox et al. |
| 2006/0129678 A1 | 6/2006 | Morita |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0248573 A1 | 11/2006 | Pannu et al. |
| 2006/0277187 A1 | 12/2006 | Roese et al. |
| 2007/0156664 A1 | 7/2007 | Norton et al. |
| 2008/0228598 A1 | 9/2008 | Leff et al. |
| 2008/0255989 A1 | 10/2008 | Altberg et al. |
| 2009/0043844 A1 | 2/2009 | Zimmet et al. |
| 2009/0089316 A1 | 4/2009 | Kogan et al. |

FOREIGN PATENT DOCUMENTS

| | | |
|---|---|---|
| EP | 1 176 840 A1 | 1/2002 |
| JP | 2000-259514 | 9/2000 |
| JP | 2000-284999 | 10/2000 |
| JP | 2001-084321 | 3/2001 |
| WO | WO 97/10558 | 3/1997 |
| WO | WO 97/46955 | 12/1997 |
| WO | WO 98/16045 | 4/1998 |
| WO | WO 99/08434 | 2/1999 |
| WO | WO 01/22258 A2 | 3/2001 |
| WO | WO 02/03216 A1 | 1/2002 |
| WO | WO 02/073886 A1 | 9/2002 |

OTHER PUBLICATIONS

David Kurlander et al., "International Conference on Computer Graphics and Interactive Techniques—Proceedings of the 23$^{rd}$ annual conference on Computer graphics and interactie techniques," *Comic Chat*, printed from http://portal.acm.org/citation.cfm?id=237260&coll=portal&d1=portal&CFID=3718856&CF. . . on Aug. 9, 2002, pp. 225-236.

Cerulean Studios, Trillian Help Center, Chapter 4, Section 1, printed from http://www.trillian.cc/help/sec-1.php?hchap=4&hsub=1 on Nov. 12, 2002, pp. 1-2.

Cerulean Studios, Trillian Help Center, Tutorials, Chapter 10, Section 5, printed from http://www.trillian.cc/help/sec-1.php?hchap=10&hsub=5 on Nov. 12, 2002, p. 1.

Cerulean Studios, Trillian Help Center, Tutorials, Chapter 10, Section 7, printed from http://www.trillian.cc/help/sec-1.php?hchap=10&hsub=7 on Nov. 12, 2002, pp. 1-2.

Pamela Parker, "Oct. 22, 2001—New Yahoo! Messenger Incorporates Viral Marketing", printed from http://siliconvalley.intemet.com/news/article.php/908221 on Oct. 30, 2002, pp. 1-3.

IntemetNews.com Staff, Apr. 17, 2002—IAR Bits and Bytes, "Yahoo! Debuts Purina IM Skin, Eagles Tour Promo," printed from http://www.intrnetnews.com/IAR/article.php/1011751 on Oct. 30, 2002, pp. 1-3.

Yahoo! Messenger, Yahoo! Help—IMVironments, printed from http://help.yahoo.com/help/us/mesg/imv/index.html on Oct. 30, 2002, p. 1.

Yahoo! Messenger, Yahoo! Help—IMVironments, printed from http://help.yahoo.com/help/us/mesg/imv/imv-04.html on Oct. 30, 2002, p. 1.
Yahoo! Messenger, Yahoo! Help—IMVironments, printed from http://help.yahoo.com/help/us/mesg/imv/imv-01.html on Oct. 30, 2002, p. 1.
Making your own Yahoo! Messenger IMVironments, printed from http://www.xcflabs.com/~yaroslav/imvironments/instructions.html on Oct. 30, 2002, pp. 1-2.
Bob Woods, Instant Messaging Planet: Public IM: IM—The Cat's Meow, printed from http://www.instantmessagingplanet.com/public/article/0,,10817_1011011,00.html. on Oct. 30, 2002, pp. 1-3.
Roy Santos, Tech TV/Review: Yahoo! Messenger 5.0, printed from http://www.techtv.com/products/print/0,23102,3351041,00.html on Oct. 30, 2002, pp. 1-2.
Rebecca Viksnins, First Look: Yahoo Messenger 5.0—Software Reviews—CNET.com, printed from http://www.cnet.com/software/0-5566362-8-7787365-1.html on Oct. 30, 2002, pp. 1-2.
ZDNet: Yahoo Messenger 5.0 Review, printed from http://www.zdnet.com/supercenter/stories/review/0,12070,538313,00.html on Oct. 30, 2002, pp. 1-3.
ZDNet: Yahoo Messenger 5.0 Overview, printed from http://www.zdnet.com/supercenter/stories/overview/0,12069,538313,00.html on Oct. 30, 2002, pp. 1-3.
Screenshot demonstration of Yahoo Messenger Help—IMVironments, Nov. 12, 2002, p. 1.
Screenshot Menu, Yahoo! Messenger Preferences, Nov. 12, 2002, p. 1.
Screenshot demonstration, karl_renner2002—Instant Message, Nov. 12, 2002, p. 1.
Yahoo: Messenger—IMVironments™, printed from http://messenger.yahoo.com/messenger/imv/index.html on Nov. 12, 2002, pp. 1-2.
Yahoo! Help—IMVironments, "How do I send an IMVironment to a friend?", printed from http://help.yahoo.com/help/us/mesg/imv/imv-04.html on Nov. 12, 2002, p. 1.
Yahoo!Messenger, Instantly communicate with all of your online friends . . . , printed from http://messenger.yahoo.com/ on May 24, 2002, p. 1.
Yahoo!Messenger—IMVironments™, List of Available IMVironments, printed from http://messenger.yahoo.com/messenger/imv/ on May 24, 2002, pp. 1-2.
Screenshot, nikebball87: AIM—nikebball87, printed from http://www.trillian.cc/skins/windowsxp.gif on May 14, 2002, p. 1.
Screenshot, Trillion 7 Skin: GoneBlue v.01, printed from http://www.trillian.cc/skins/goneblue.jpg on May 14, 2002, p. 1.
Screenshot, Dream Green, printed from http://www.trillian.cc/skins/DreamGreen.jpg on May 14, 2002, p. 1.
Screenshot, Trillion chosenOS, printed from http://www.trillian.cc/skins/chosen_trill.jpg on May 14, 2002, p. 1.
Netscape 7.0, Preview Release 1, Reviewer's Guide, May 17, 2002, chapter 2, "Internet Messaging," pp. 9-10 and "Instant Messaging with AIM (AOL Instant Messenger$^{SM}$)," pp. 16-18.
iPlanet Instant Messenger Release 3.0 Quick Reference, Oct. 2001, pp. 1-5.
"About Internet directory services," Outlook 2000 SR-1 (9.0.0. 4527) Help File, on or before Aug. 10, 2001, p. 1.
"Active Directory Features," [online], Jun. 15, 1999 [retrieved on May 13, 2003]. Retrieved from the Internet http://www.microsoft.com/windows2000/server/evaluation/features/adlist.asp, pp. 1-4.
"Active Directory Service Overview," [online], Nov. 30, 2001 [retrieved on May 13, 2003]. Retrieved from the Internet <http://www.microsoft.com/windows2000/server/evaluation/business/addatasheet.asp>, pp. 1-5.
"Active Directory," [online], [retrieved on May 13, 2003]. Retrieved from the Internet http://www.microsoft.com/windows2000/technologies/directory/AD/default.asp, pp. 1-13.
"AOL Instant Messenger All New Version 2.0," Jun. 24, 1999, 2 pages.
"AOL technology: turning complicated things into engaging services," 1996 Annual Report, 22 pages.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.
"Directory Integration Can Lower Total Cost of Ownership and Increase Application Functionality," [online], Jul. 27, 1998, [retrieved on May 13, 2003]. Retrieved from the Internet http://www.microsoft.com/presspas/press/1998/July98/ActivDPR.asp, pp. 1-4.
"Enterprise Identity Management with Windows 2000 and Active Directory," [online], 1999 [retrieved on May 13, 2003]. Retrieved from the Internet http://www.microsoft.com/technet/prodtechnol/ad/windows2000/evaluate/w2keims.asp?fra . . . , pp. 1-16.
"Frequently Asked Questions About AOL Instant Messenger," Jun. 24, 1999, 6 pages.
"Integrating Applications with Windows 2000 and Active Directory," [online], Oct. 2000 [retrieved on May 8, 2003]. Retrieved from the Internet <http:/www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Introducing the Gordano Messaging Suite," http://www.gordano.com, Copyright 1994-2003, Gordano, 3 pages.
"Look up contact information from an item," Outlook 2000 SR-1 (9.0.0 4527) Help File, on or before Aug. 10, 2001, p. 1.
"New Features in AOL Instant Messenger for Windows v. 2.01 Beta," Apr. 28, 1999, 2 pages.
"Part II: Tasks and Procedures," Active Directory Operations Guide, Microsoft Corporation, Microsoft Windows 2000, Version 1.5, Published Dec. 5, 2002, pp. 1-131.
"AOL Instant Messenger All New Version 2.0 Quick Tips for Getting Started," Jun. 24, 1999, 5 pages.
"Set up LDAP directory services," Outlook 2000 SR-1 (9.0.0 4527) Help File, on or before Aug. 10, 2001, p. 1.
"The LP Wireless Messenger," Messenger Documentation, [online]. LP Wireless, Inc., 2002, retrieved on Nov. 2, 2002 from http://www.lpwireless.com/messengerhelp.htm, pp. 1-7.
"Using Active Directory Service," from Chapter 5, Microsoft Windows 2000 Administrator's Pocket Consultant, by William R. Stank (1999). pp. 1-6.
"What is AOL Instant Messenger," Jun. 24, 1999, 3 pages.
"Windows 2000 Directory Services," [online] http://www.microsoft.com/windows2000/technologies/directory/default.asp, Nov. 25, 2001, 1 page.
"YAHOO! Messenger Makes the World a Little Smaller, More informed," Jun. 21, 1999, pp. 1-2.
Alan Cohen, "Instant Messaging," PC Magazine, PC Labs, Apr. 13, 1999, 2 pages.
J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal.asp?frame=true>, pp. 1-18.
Kohda et al., IMPP: A New Instant Messaging Standard and Its Impact on Internet Business, Dec. 2000, Fujitsu Sci. Tech. J., 36, 2, pp. 147-153.
McKendrick, Joseph, "Internet Call Centers: New Era in Customer Service," Feb. 2002, vol. 10, n2, 5 pages.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_adsiexch.asp?frame=true>, pp. 1-12.
Microsoft Corporation, "Comparing Microsoft Active Directory to Novell's NDS," [online], Sep. 1998 [retrieved on May 13, 2003]. Retrieved from the Internet <http://msdn.microsoft.com/library/en-us/dnactdir/html/msdn_activedirvsnds.asp?frame=true>, pp. 1-17.
Microsoft Corporation, "Introduction to Active Directory Application Mode," Microsoft Windows Server 2003, Aug. 2002, pp. 1-13.
Microsoft Corporation, "Introduction to Active Directory Application Mode," Microsoft Windows Server 2003, Aug. 2002. 16 pages.

Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame=true>, pp. 1-9.

Part I: Active Directory Operations, Active Directory Operations Guide, Microsoft Corporation, Microsoft Windows 2000, Version 1.5, Published Dec. 5, 2002, pp. 1-187.

Stank, William R., "Working with Active Directory Domains," from Chapter 5, Microsoft Windows 2000 Administrator's Pocket Consultant, (1999). pp. 1-10.

International Search Report for International Application No. PCT/US03/15715, mailed Aug. 14, 2003, 6 pages.

* cited by examiner

FIG. 12

SYSTEM AND METHODS FOR PROVIDING MULTIPLE PERSONAS IN A COMMUNICATIONS ENVIRONMENT

This application is a continuation-in-part of U.S. patent application Ser. No. 10/715,209, filed Nov. 18, 2003 now U.S. Pat. No. 7,636,751, and claims priority from International Application No. PCT/US03/36796, filed Nov. 18, 2003, U.S. Provisional Application No. 60/427,941, filed Nov. 21, 2002, U.S. Provisional Application No. 60/464,106, filed Apr. 21, 2003, and U.S. Provisional Application No. 60/488,399, filed Jul. 21, 2003, all of which are incorporated by reference.

TECHNICAL FIELD

This description relates to projecting multiple personalities in communications for a communications application operator (hereinafter "sender") and/or changing features and functionality based on the selected personality.

BACKGROUND

Online service providers facilitate access to information and services by providing interactive User Interfaces (UIs) that help users navigate to desired resources. For example, in the case of a system that enables the exchange of instant messages (IMs), a UI allows an IM sender to invoke actions, such as establishing a communications link, through the selection of screen objects such as icons, windows, and drop-down menus. The design of a UI has a significant impact on an IM sender's online experience. In particular, the icons, the windows, and the menus of a UI may be arranged to enable an IM sender to locate information and services quickly and easily.

An IM sender may send self-expression items to an IM recipient. Current implementations of self-expression in instant messaging enable a user to individually select self-expression settings, such as a Buddy Icon and Buddy Wallpaper, which settings thereafter project to everyone who sees or interacts with that person online.

SUMMARY

A user may name and save multiple different "personas" or "personalities," which are groups of instant messaging self-expression settings such as, for example, Buddy Icons, Buddy Sounds, Buddy Wallpaper and Emoticons (e.g., Smileys). Then, depending on the identity with whom the user communicates, they may quickly access and adopt one of their personalities in at least an instant messaging environment, and may manage the online appearance they present to others. Functionality and features of the instant messaging interface may differ based upon the personality being used in the IM conversation.

In one general aspect, a user interface on a display enables perception of communications that leverage an instant messaging platform. The user interface includes a module for identifying at least two identities within an instant messaging communications environment to whom messages may be directed, a module for associating a first persona of a user with a first functionality, a module for associating a second persona of the user with a second functionality, the second functionality differing from the first functionality, a module for rendering an instant messaging application user interface for a first instant messaging communications session involving the user and a first identity and a second instant messaging communications session involving the user and a second identity, the user interface being presented at a system display presented to the user, and a module for enabling the first person of the user to be projected to the first identity while concurrently enabling a second persona of the same user to be projected to the second identity.

Implementations may include one or more of the following features. For example, the first functionality may include encrypting messages sent by the user during the first instant messaging communications session and the second functionality may include not encrypting messages sent by the user during the second instant messaging communications session. In another example, the first functionality may include decrypting messages received by the user during the first instant messaging communications session and the second functionality may include not decrypting messages received by the user during the second instant messaging communications session. In another example, the first functionality may include logging messages sent and received by the user during the first instant messaging communications session and the second functionality may include not logging messages sent and received by the user during the second instant messaging communications session. The first functionality also may include providing a notification concerning the message logging by the user to the first of the identities and the second functionality may include not providing a notification concerning the message logging by the user to the second of the identities.

In another example, the first functionality may include determining the routing of a message received by the user during the first instant messaging communications session. Determining the routing of the message may include determining the routing of the message over a communications mode other than the communications mode over which the message was received. The message may be routed using the determined routing. Routing the message may include forwarding the message to a different user. The message may be forwarded, for example, via e-mail. In a further example, the first functionality includes providing a notification concerning the message routing to the first of the identities. The routing may be determined based upon an online presence state of the user. The second functionality may include not determining a routing of a message received by the user during the second instant messaging communications session.

In another implementation, the first persona and the second persona each include at least one shared functionality. For example, the shared functionality may include logging messages sent and received by the user during the first and the second instant messaging communications sessions. In another example, the first functionality may include encrypting messages sent by the user during the first instant messaging communications session and the second functionality may include not encrypting messages sent by the user during the second instant messaging communications session. In another example, the shared functionality may include encrypting messages sent by the user during the first and the second instant messaging communications sessions, the first functionality may include logging messages sent and received by the user during the first instant messaging communications session and the second functionality may include not logging messages sent and received by the user during the second instant messaging communications session.

The user interface also may include a module for associating the first persona with a first group of identities such that the first persona is projected to members of the first group of identities in a communications session, where the first of the identities is included within the first group of identities. The user interface also may include a module for associating the second persona with a second group of identities such that the second persona is projected to members of the second group of identities in a communications session, where the second of the identities is included within the second group of identities.

The user interface also may include a module for associating an individual persona with the first of the identities, associating a group persona with a group of the identities with which the first of the identities is associated, and associating a global persona with each of the identities, where the first persona projected to the first of the identities comprises an amalgamation of the individual persona associated with the first of the identities, the group persona associated with the group of the identities, and the global persona associated with each of the identities. In one example, the individual persona associated with the first of the identities overrides the group persona associated with the group of the identities and the group persona associated with the group of the identities overrides the global persona associated with each of the identities, to the extent a conflict exists.

The communications session may be an instant messaging communications session. The identities may be members of a buddy list, including the online presence state of the identities.

In one implementation, the user interface may include a module for projecting the functionality of the first persona of the user to the first of the identities while concurrently projecting the functionality of the second persona of the same user to the second of the identities. The user interface also may include a module for selecting among the first and second personas for projection to a particular one of the identities based on an attribute of the particular identity.

The user interface also may include a module for receiving from the user a selection of at least the first and second personas. The user interface also may include a module for selecting functionality of the first persona based upon an attribute of the first identity.

The user interface also may include a module for configuring the functionality of the first persona assigned to the first identity to change based upon the occurrence of a predetermined event. The predetermined event may be based, for example, upon a time of day, a day of the week, or the passage of a pre-determined interval of time. The predetermined event may be, for example, a weather condition at a predetermined geographic location, the communication of a predetermined word, the communication of a predetermined emoticon, a predetermined date, or the communication of a predetermined number of instant messages from the first identity.

In another general aspect, a computer implemented method for enabling perception of multiple online personas in an instant messaging communications session includes identifying at least two identities within a communications environment to whom messages may be directed, associating a first persona of a user with a first functionality, associating a second persona of the same user with a second functionality, the second functionality differing from the first functionality, and enabling the first persona of the user to be projected to a first of the identities while concurrently enabling the second persona of the same user to be projected to a second of the identities.

Implementations may include one or more of the following features. For example, the first functionality may include encrypting messages sent by the user during an instant messaging communication session with the first of the identities and the second functionality may include not encrypting messages sent by the user during an instant messaging communication session with the second of the identities. In another example, the first functionality includes decrypting messages received by the user during an instant messaging communication session with the first of the identities and the second functionality includes not decrypting messages received by the user during an instant messaging communication session with the second of the identities. In another example, the first functionality includes logging messages sent and received by the user during an instant messaging communication session with the first of the identities and the second functionality comprises not logging messages sent and received by the user during an instant messaging communication session with the second of the identities. The first functionality may include providing a notification concerning the message logging by the user to the first of the identities and the second functionality may include not providing a notification concerning the message logging by the user to the second of the identities.

In another example, the first functionality includes determining a routing of a message received by the user during an instant messaging communications with the first of the identities. Determining the routing may include determining a routing of the message over a communications mode other than the communications mode over which the message was received. The message may be routed using the determined routing. Routing the message may include forwarding the message to a different user, for example, via e-mail. The first functionality also may include providing a notification concerning the message routing to the first of the identities. Determining the routing may include determining the routing based upon an online presence state of the user. The second functionality may include not determining a routing of a message received by the user during an instant messaging communications with the second of the identities.

In another implementation, the first persona and the second persona each include at least one shared functionality. The shared functionality may include logging messages sent and received by the user during an instant messaging communication session with the first of the identities and the second of the identities, the first functionality may include encrypting messages sent by the user during an instant messaging communication session with the first of the identities and the second functionality may include not encrypting messages sent by the user during an instant messaging communication session with the second of the identities. The shared functionality also may include encrypting messages sent by the user during an instant messaging communication session with the first of the identities and the second of the identities, the first functionality may include logging messages sent and received by the user during an instant messaging communication session with the first of the identities, and the second functionality may include not logging messages sent and received by the user during an instant messaging communication session with the second of the identities.

In another implementation, the first persona is associated with a first group of identities such that the first persona is projected to members of the first group of identities in a communications session, where the first of the identities is included within the first group of identities. The second persona may be associated with a second group of identities such that the second persona is projected to members of the second group of identities in a communications session, where the second of the identities is included within the second group of identities.

In another implementation, an individual persona is associated with the first of the identities, a group persona is associated with a group of the identities with which the first of the identities is associated, and a global persona is associated with each of the identities, where the first persona projected to the first of the identities includes an amalgamation of the individual persona associated with the first of the identities, the group persona associated with the group of the identities, and the global persona associated with each of the identities. The individual persona associated with the first of the identities may override the group persona associated with the group of the identities and the group persona associated with the group of the identities may override the global persona associated with each of the identities, to the extent a conflict exists.

In one implementation, the communications session includes an instant messaging communications session, and the identities are members of a buddy list. The buddy list may include the online presence state of the identities.

In another implementation, the functionality of the first persona of the user is projected to the first of the identities while concurrently projecting the functionality of the second persona of the same user to the second of the identities. A selection may be made among the first and second personas for projection to a particular one of the identities based on an attribute of the particular identity. A selection of at least the first and second personas may be received from the user. The functionality of the first persona may be selected based upon an attribute of the first identity.

In another implementation, the functionality of the first persona assigned to the first identity may be configured to change based upon the occurrence of a predetermined event. The predetermined event may be based, for example, upon a time of day, a day of the week, or the passage of a predetermined interval of time. The predetermined event may be, for example, a weather condition at a predetermined geographic location, communication of a predetermined word, communication of a predetermined emoticon, a predetermined date, or communication of a predetermined number of instant messages from the first identity.

Aspects of multiple personalities may be implemented by an apparatus and/or by a computer program stored on a computer readable medium. The computer readable medium may comprise a disc, a client device, a host device, and/or a propagated signal. In addition, aspects of the multiple personalities may be implemented in a client/host context or in a standalone or offline client device. The multiple personalities may be rendered in a client/host context and may be accessed or updated through a remote device in a client/host environment. The multiple personalities also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

Figure 1:
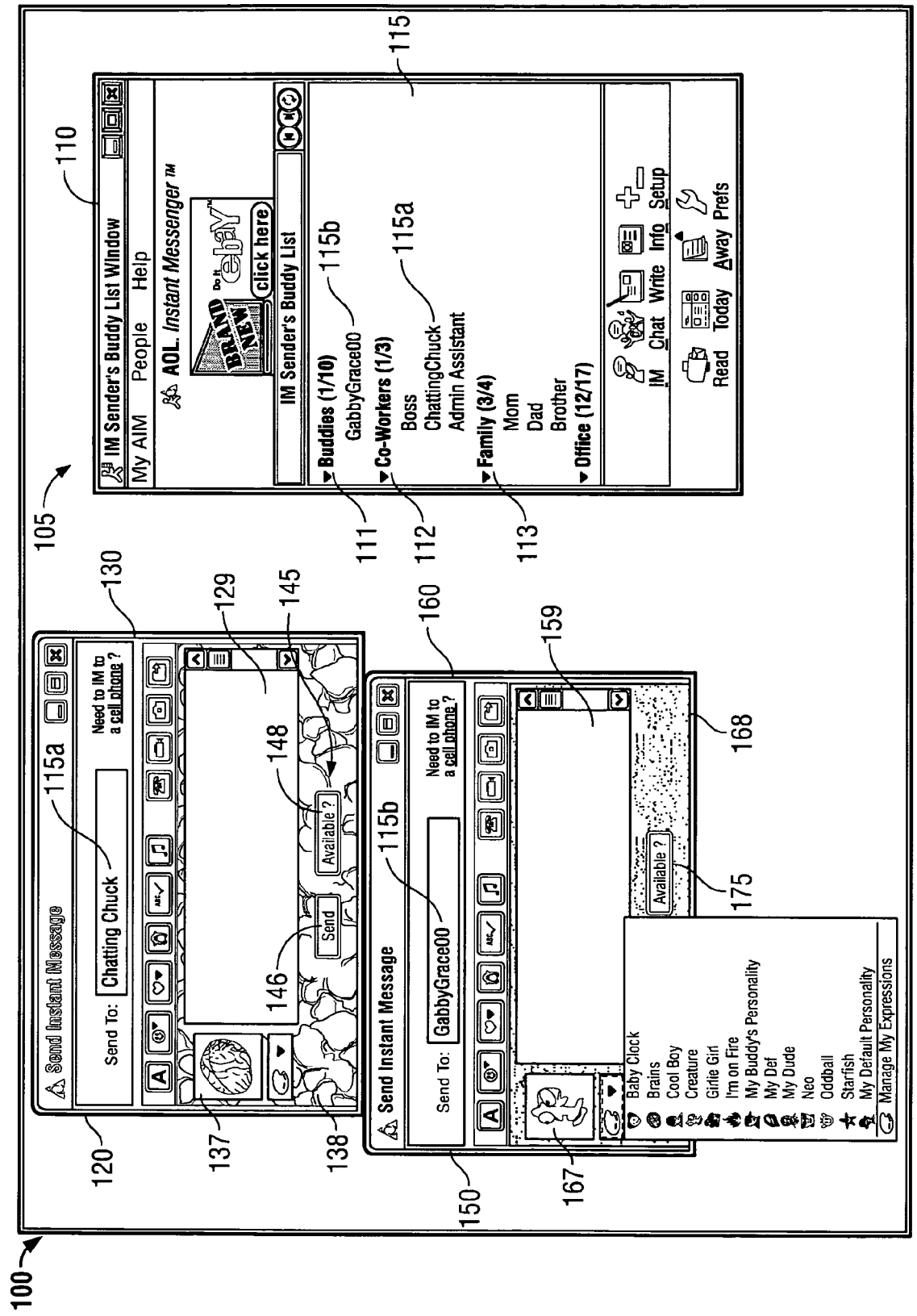
FIG. 1 is an illustration of a graphical user interface.

For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

It is possible, through the systems and techniques described herein, to enable users to assemble one or more self-expression items into a collective "persona" or "personality," which may then be saved and optionally associated with one or more customized names or groups of names. Self-expression items are used to represent the IM sender or a characteristic or preference of the IM sender, and may include user-selectable binary objects. The self-expression items may be made perceivable by a potential IM recipient ("IM recipient") before, during, or after the initiation of communications by a potential IM sender ("IM sender"). For example, self-expression items may include images, such as wallpaper, that are rendered in a location having a contextual placement on a user interface. The contextual placement typically indicates an association with the user represented by the self-expression item. For instance, the wallpaper may be rendered in an area where messages from the IM sender are displayed, or as a chrome (i.e., border) around a dialog area on a user interface. Self-expression items also include icons such as buddy icons and mini-buddy icons, sounds, animation, video clips, and emoticons (e.g., smileys).

The personality may also include a set of features or functionality associated with the personality. For example, features such as encrypted transmission, IM conversation logging, and forwarding of instant messages to an alternative communication system may be enabled for a given personality. The features or functionality for one person may differ relative to another.

Users may assign personalities to be projected when conversing with other users, either in advance of or "on-the-fly" during a communication session. This allows the user to project different personalities to different people on-line. In particular, users may save one or more personalities (e.g., where each personality typically includes groups of instant messaging self-expression items such as, for example Buddy Icons, Buddy Sounds, Buddy Wallpaper, and Smileys, and/or a set of features and functionalities) and they may name those personalities to enable their invocation, they may associate each of different personalities with different users with whom they communicate or groups of such users so as to automatically display an appropriate/selected personality during communications with such other users or groups, or they may establish each of different personalities during this process of creating, adding or customizing lists or groups of users or the individual users themselves. Thus, the personalities may be projected to others in interactive online environments (e.g., Instant Messaging and Chat) according the assignments made by the user. Moreover, personalities may be assigned, established and/or associated with other settings, such that a particular personality may be projected based on time-of-day, geographic or virtual location, or even characteristics or attributes of each (e.g., cold personality for winter in Colorado or chatting personality while participating in a chat room).

When different functions are associated with each of several different personas, selection and projection of a persona to different buddies will invoke different functions with respect to the communications involving these buddies. For example, if a work persona with encrypted IM functionality is associated with the screen name of a co-worker and a home personality without encrypted IM functionality is associated with the screen name of a neighbor, then communications involving the co-worker will invoke encrypted IM functionality and communications involving the neighbor will not.

Moreover, it is possible for the user to maintain and project a consistent perceivable persona while invoking different functionality with respect to communications between different buddies. For example, aspects of a persona other than functionality may be chosen by the user to be the same. Thus, a user may assign encrypted IM functionality to the screen name of a co-worker and not assign encrypted IM functionality to the screen name of a neighbor. The user will present a consistent perceivable persona to both the co-worker and the neighbor, however different functionality will be associated with the communications with the co-worker and the neighbor. In particular, communications involving the co-worker will invoke encrypted IM functionality and communications involving the neighbor will not.

FIG. 1 illustrates an exemplary graphical user interface 100 viewed by a user (IM sender) whose instant messaging communication program is configured to project different personalities to two or more other users or user groups (IM recipients). In particular, the user is projecting two different personalities in two concurrent IM conversations with two different IM recipients, ChattingChuck 115a and GabbyGrace00 115b. The instant messaging communications sessions may be conducted simultaneously, near-simultaneously, or serially. A user interface (UI) 105 is rendered on the display 100 and includes an instant messaging (IM) buddy list 110, a first IM UI 120, and a second IM UI 150.

The IM buddy list 110 includes an IM sender-selected list 115 of potential instant messaging recipients ("buddies"). Buddies typically are contacts who are known to the potential instant message sender. The IM buddy list 110 may indicate to the IM sender whether or not one or more of the IM recipients on the buddy list are present, for instance, that they are or are not online and available for instant messaging communications. Buddies may be grouped by an IM sender into a user-defined or a pre-selected grouping ("groups"). As shown, the IM buddy list 110 has three categories of groups, Buddies 111, Co-Workers 112, and Family 113. At least two potential instant messaging recipients 115a, 115b are online. GabbyGrace00 115b belongs to the Buddies group 111, and ChattingChuck 115a belongs to the Co-Workers group 112.

The first IM UI 120 is rendered to the IM sender for an IM communications session with a first IM recipient, in this case ChattingChuck 115a. The first IM UI 120 includes self-expression items chosen by the IM sender to be projected to the first IM recipient 115a, such as a first buddy icon 137 and first IM wallpaper 138. The online persona defined for any particular IM, such as IM recipient 115a, includes the collection of self-expression items and/or features and functionalities. For example, the online persona may include one or more features giving a certain functionality for the IM communications session, such as automatic logging of IM conversations, encryption of IM messages, and forwarding of IM messages to another user such as an administrative assistant.

The first IM UI 120 includes an IM display and compose area 129 for composing IM messages to be sent to the first IM recipient 115a and for displaying a transcript of the IM communication session with the first IM recipient 115a. The IM display and compose area 129 also may display wallpaper that is consistent with or independent of wallpaper 138, the wallpaper within IM display and compose area 129 being selectable by the IM sender as part of the first persona.

The first IM UI 120 also includes a set of feature controls 130 and a set of transmission controls 145. The feature controls 130 may control features such as encryption, conversation logging, conversation forwarding to a different communications mode, font size and color control, and spell checking, among others. The set of transmission controls 145 includes a control 146 to send the message that was typed into the IM display and compose section 129, and a control 148 to check whether the potential IM recipient is available for IM communications.

Font and appearance controls may be provided in the feature controls 130 of IM UI 120 and configured as part of a particular persona to control how the message being entered in the IM display and compose area 129 is displayed in the IM display and compose area 129 as a transmitted message once the composed message in the IM display and compose area 129 is sent. The appearance of sent messages in the display may differ from the appearance of messages being composed in the display, but not yet sent. The display of first self-expression items 137, 138 in the first IM UI 120 enables the IM sender to conveniently perceive the online persona being projected to the particular IM recipient with whom the IM sender is presently communicating, which in this case is the first IM recipient, ChattingChuck 115a.

The second IM UI 150 is rendered to the IM sender for an IM communications session with a second IM recipient, which in this case is GabbyGrace00 115b, and has characteristics similar to those described above with respect to the first IM UI 120. However, the online persona projected by the IM sender to the second IM recipient 115b may differ from the online persona projected by the IM sender to the first IM recipient 115a, and similarly, the features and functions employed automatically with respect to the online persona for the second IM recipient 115b may be configured to differ from those employed automatically with respect to the first IM recipient 115a. For example, the persona projected to ChattingChuck 115a (the first persona) may be based on an association between the first persona and the group to which ChattingChuck 115a belongs, which in this case is the Co-Workers group 112. Or, as one alternative, the persona projected to ChattingChuck 115a may be based on an association between the persona and the individual IM recipient, i.e., ChattingChuck 115a. Similarly, the persona projected to GabbyGrace00 115b (the second persona) may be based on an association between the second persona and the group to which GabbyGrace00 115b belongs, which in this case is the Buddies group 111. Or, as one alternative, the persona projected to GabbyGrace00 115b may be based on an association between the persona and the individual IM recipient, i.e., GabbyGrace00 115b.

The second IM UI 150 includes self-expression items chosen by the IM sender to be projected to the second IM recipient 115b, such as a second buddy icon 167 and second IM wallpaper 168. The online persona defined for any particular IM recipient, such as IM recipient 115b, typically includes the collection of self-expression items, and may differ from the online persona projected to the first IM recipient 115a in the first IM UI 120. The online persona also may include features and functionality for the IM communications session with the second IM recipient 115b, such as automatic logging of IM conversations, encryption of IM messages, and forwarding of IM messages to another user such as an administrative assistant. The second IM UI 150 also includes an IM display and compose area 159 for composing IM messages to be sent to the second IM recipient 115b and for displaying a transcript of the IM communication session. The IM display and compose area 159 also may display wallpaper that is consistent with or independent of wallpaper 168, the wallpaper within IM display and compose area 159 being selected by the IM sender as part of the second persona.

The second IM UI 150 includes a set of feature controls 160, and a set of transmission controls 175. The feature controls 160 and transmission controls 175 have similar functionality to that described above with respect to the feature controls 130 and transmission controls 145 of the first IM UI 120. Font and appearance controls may be provided in the feature controls 160 of IM UI 150 and configured as part of a particular persona to control how the message being entered in the IM display and compose area 159 is displayed before and after the message in the IM display and compose area 159 is sent. The display of second self-expression items 167, 168 in the second IM UI 150 enables the IM sender to easily keep track of the online persona being projected to the particular IM recipient with whom the IM sender is communicating, which in this case is the second IM recipient, GabbyGrace00 115b.

An IM sender may create an online persona or personality from an IM sender-selected group or a pre-selected group of self-expression items and/or features and functionality. For example, an IM sender may separately choose a Buddy Icon, Sound, Wallpaper and Smiley and save the set of self-expression items as a personality with a given name, such as "Work," "Social," and "Rainy Day." The IM sender may also select certain features and functionalities to be saved under the personality. For instance, the IM sender may choose to create and save for later invocation a "Social" personality by combining a Buddy Icon of a butterfly, a Buddy Sound of laughter, a Buddy Wallpaper of musical notes, and a Smiley set of beer mugs. The IM sender may also choose not to adopt any special features or functionality for this personality. The IM sender may configure their communications system to invoke their "Social" personality for only a subset of IM recipients and that personality perhaps being defined with less than all personalization items being specified such that aspects of the Social personality are amalgamated with aspects of one or more other personalities invoked during a communication sessions with a particular IM recipient. The IM sender also may configure their communications system to invoke their "Social" personality a upon the occurrence of predetermined event at the IM sender site such as, for example, a day of the week, a holiday, or a time of day. By way of illustration, if a persona invoked for an IM recipient includes a buddy icon and a buddy sound, that persona may be modified on a Friday evening through substitution of the Social personality Buddy Sound only, maintaining the buddy icon. User-specified rules can be used as a basis for determining whether/how to amalgamate situational personalities (e.g., the Social personality) with user-based personalities.

As a second example, the IM sender may create a "Work" personality by combining a Buddy Icon of a beaver, a Buddy Sound of a clock ticking, a Buddy Wallpaper of power tools, and a Smiley set of clock faces. This Work personality may also include features and functionality such that messages sent during invocation of the Work personality are encrypted and conversations are logged/recorded, automatically or by default.

The personalities created or adopted by the IM sender may have completely different self-expression settings, or may have some overlap in self-expression settings. The personalities also may have completely different features and functionality, or may have some overlap. In the exemplary personalities described above, for example, the IM sender could change the Buddy Wallpaper so that both the "Social" and the "Work" personalities have a Buddy Wallpaper of musical notes and both send encrypted messages. In another implementation, the IM sender could choose a pre-selected set of self-expression items, which may be related by a theme. For example, the theme may relate to a favorite football team and may include a buddy icon of the team mascot, buddy wallpaper of the team colors, and a buddy sound of an excerpt of the team fight song or appropriate sound from the team mascot. In one implementation, the themed persona could be purchased or leased by the IM sender.

As a third example, the IM sender may also select certain features and functionalities to be saved under a personality and triggered upon the occurrence of an event. For instance, the IM sender may choose to create and save for later invocation a "Rainy Day" personality by combining a Buddy Icon of an umbrella, a Buddy Sound of rain falling, a Buddy Wallpaper of clouds, and a Smiley set of raindrops. The IM sender may also choose not to adopt any special features or functionality for this personality. The IM sender may configure their communications system to invoke their "Rainy Day" personality when the environmental condition experienced at the IM sender site include rain, the Rainy Day personality perhaps being invoked for only a subset of IM recipients and that personality perhaps being defined with less than all personalization items being specified such that aspects of the Rainy Day personality are amalgamated with aspects of one or more other personalities invoked during a communication sessions with a particular IM recipient. By way of illustration, if a persona invoked for an IM recipient includes a buddy icon and a buddy sound, that persona may be modified on a Rainy Day through substitution of the Rainy Day personality Buddy Sound only, maintaining the buddy icon. User-specified rules can be used as a basis for determining whether/how to amalgamate situational personalities (e.g., the Rainy Day personality) with user-based personalities.

For example, the user may invoke settings so that the Rainy Day personality is be globally applied to all other personalities based on triggers unrelated to invocation by the user of a communication session with a particular user, or it may be associated with only a subset of users if desired.

An IM sender may create multiple different personalities, one or more of which may be assigned to one or different of particular IM recipients, or groups of several IM recipients defined by the user (e.g., within the Buddy List) or otherwise. For example, the IM sender may assign her "Social" personality to one or more of her family members, who may be, for example, in a "family" group 117 of buddies but may assign her more professional and upbeat "Work" Personality to a group identified as "co-workers" in her content or Buddy list to enable future application of the Work personality to each of the constituent office colleagues forming the co-worker group 19. The particular IM recipient or recipients will see the specific personality that the IM sender has assigned them whenever they converse with the IM sender online.

As an example, if the first IM recipient 115a has been assigned the "Social" personality, then the first IM UI 120 would display a first buddy icon 137 of a butterfly, first buddy wallpaper 138 of musical notes, and a buddy sound of laughter. By contrast, if the second IM recipient 115b has been assigned the "Work" personality, then the second IM UI 150 would display a second buddy icon 167 of a beaver, second buddy wallpaper 168 of power tools, and a buddy sound of clocks ticking.

Also, an IM sender may quickly assign personalities to a specific IM recipient or group of recipients or change or modify personalities with respect to a specific IM recipient or group of recipients during an instant messaging conversation. For example, the IM sender may use a chooser that is embedded in the conversation window. An IM sender also may change personalities within a chooser interface.

This approach provides an IM sender with the ability to, among other things, save groups of expressions and/or features and functionality with custom names, assign a personality to specific IM recipients or groups of IM recipients, and access and assign the personalities quickly, for example, an interface such as the instant messaging conversation window or the chooser interface.

Personalities may be assigned on a global basis, a group basis, and/or an individual (personal) basis. Also, the self-expression items may be assigned to personalities on a per-individual basis, a per-group basis or a global basis. In one implementation, self-expression items and/or features and functionality may be assigned on a "global" basis to all individuals, a "group" basis for individuals belonging to a particular group (e.g. friends, family, or co-workers), or an "individual" basis for a single individual IM recipient.

The persona may be changed by the IM sender before, during, or after an IM communication session with an IM recipient. In one implementation, the persona may change, or the user may be prompted to change, the persona after a pre-determined period of time or upon other conditions, such as a day of the week, a time of day, a holiday, a calendar event such as a birthday or wedding, a weekday, or a weekend day. In another implementation the persona, could change upon the occurrence of an event, such as a holiday or upon detecting certain language or emoticons in the IM conversation. In yet another implementation, the persona could change randomly.

Typically, IM communications involve an instantaneous or nearly instantaneous communication between two users, where each user is able to transmit, receive and display communicated information. Additionally, IM communications generally involve the display and perception of online presence information regarding other selected IM recipients. IM communications may be machine-to-machine communications that occur without intervention by or communication through an instant messaging server after a communication session is established or authentication is performed.

Figure 2:
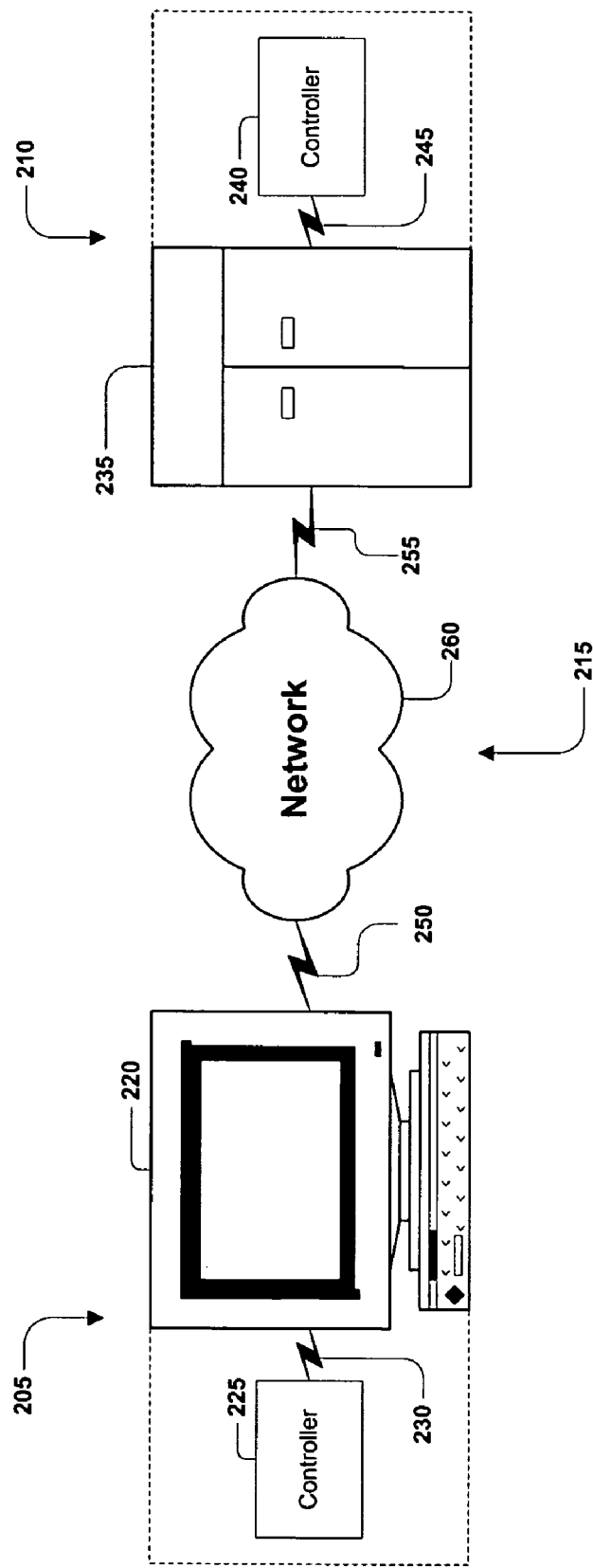
FIGS. 2-4 and 14 are block diagrams of an exemplary communications system.
Figure 3:
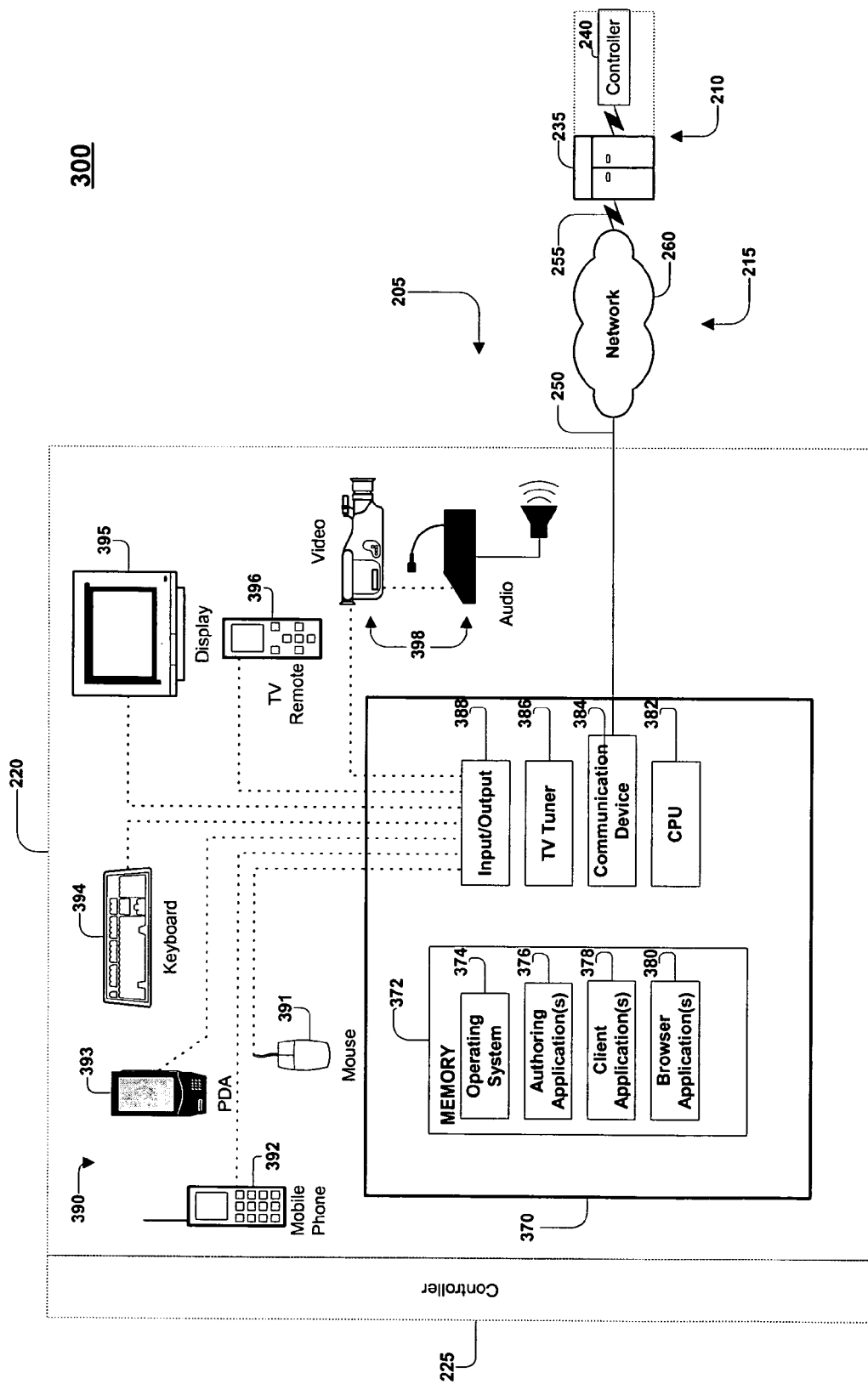
Figure 4:
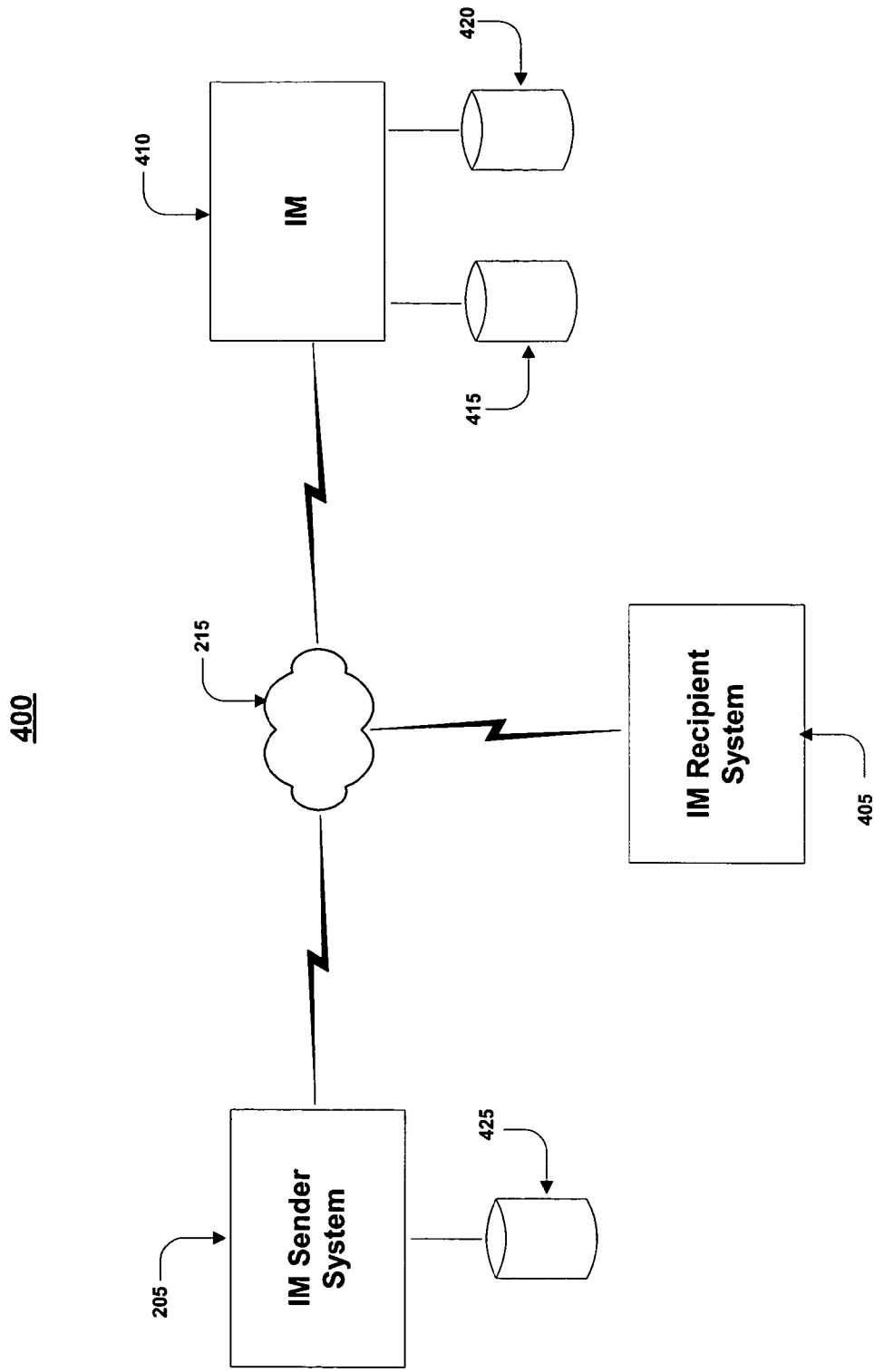

For illustrative purposes, FIGS. 2, 3 and 4 show an example of a communications system for implementing techniques for transferring electronic data.

Referring to FIG. 2, a communications system 200 is capable of delivering and exchanging data between an IM sender system 205 and a host system 210 through a communications link 215. The IM sender system 205 typically includes one or more client devices 220 and/or client controllers 225, and the host system 210 typically includes one or more host devices 235 and/or host controllers 240. For example, the IM sender system 205 or the host system 210 may include one or more general-purpose computers (e.g., personal computers), one or more special-purpose computers (e.g., devices specifically programmed to communicate with each other and/or the IM sender system 205 or the host system 210), or a combination of one or more general-purpose computers and one or more special-purpose computers. The IM sender system 205 and the host system 210 may be arranged to operate within or in concert with one or more other systems, such as, for example, one or more LANs ("Local Area Networks") and/or one or more WANs ("Wide Area Networks").

The client device 220 and the host device 235 are generally capable of executing instructions under the command of, respectively, a client controller 225 and a host controller 240. The client device 220 and the host device 235 are connected to, respectively, the client controller 225 and the host controller 240 by, respectively, wired or wireless data pathways 230 and 245, which are capable of delivering data.

The client device 220, the client controller 225, the host device 235, and the host controller 240 typically each include one or more hardware components and/or software components. An example of a client device 220 or a host device 235 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 220 and the host device 235 may include devices that are capable of establishing peer-to-peer communications.

An example of client controller 225 or host controller 240 is a software application loaded on the client device 220 or the host device 235 for commanding and directing communications enabled by the client device 220 or the host device 235. Other examples include a program, a piece of code, an instruction, a device, a computer, a computer system, or a combination of these for independently or collectively instructing the client device 220 or the host device 235 to interact and operate as described. The client controller 225 and the host controller 240 may be embodied permanently or temporarily in any type of machine, component, physical or virtual equipment, storage medium, or propagated signal capable of providing instructions to the client device 220 and the host device 235.

The communications link 215 typically includes a delivery network 260 that provides direct or indirect communication between the IM sender system 205 and the host system 210, irrespective of physical separation. Examples of a delivery network 260 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 215 may include communication pathways 250 and 255 that enable communications through the one or more delivery networks 260 described above. Each of the communication pathways 250 and 255 may include, for example, a wired, wireless, cable or satellite communication pathway.

FIG. 3 illustrates a communications system 300 including an IM sender system 205 communicating with a host system 210 through a communications link 215.

The IM sender system 205 includes a client device 220 that typically includes a general-purpose computer 370 having an internal or external memory 372 for storing data and programs such as an operating system 374 (e.g., DOS, Windows™, Windows 95™, Windows 98™, Windows 2000™, Windows Me™, Windows XP™, Windows N™, OS/2, or Linux) and one or more application programs. Examples of application programs include authoring applications 376 (e.g., word processing programs, database programs, spreadsheet programs, or graphics programs) capable of generating documents or other electronic content; client applications 378 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 380 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 372 of the general-purpose computer 370. Alternatively, in another implementation, the client controller 225 may access application programs externally stored in and/or performed by one or more device(s) external to the general-purpose computer 370.

The general-purpose computer 370 also includes a central processing unit 382 (CPU) for executing instructions in response to commands from the client controller 225, and a communication device 384 for sending and receiving data. One example of the communication device 384 is a modem. Other examples include a transceiver, a set-top box, a communication card, a satellite dish, an antenna, a network adapter, or some other mechanism capable of transmitting and receiving data over the communications link 215 through a wired or wireless data pathway 250. The general-purpose computer 370 optionally includes a television ("TV") tuner 386 for receiving television programming in the form of broadcast, satellite, and/or cable TV signals. The TV tuner 386 permits the client device 220 to selectively and/or simultaneously display network content received by communications device 384 and TV programming content received by the TV tuner 386.

The general-purpose computer 370 may include an input/output interface 388 that enables wired or wireless connection to various peripheral devices 390. Examples of peripheral devices 390 include, but are not limited to, a mouse 391, a mobile phone 392, a personal digital assistant (PDA) 393, an MP3 player (not shown), a keyboard 394, a display monitor 395 with or without a touch screen input, a TV remote control 396 for receiving information from and rendering information to users, and an audiovisual input device 398.

Although FIG. 3 illustrates devices such as a mobile telephone 392, a PDA 393, and a TV remote control 396 as being peripheral with respect to the general-purpose computer 370, in another implementation, such devices may themselves include the functionality of the general-purpose computer 370 and operate as the client device 220. For example, the mobile phone 392 or the PDA 393 may include computing and networking capabilities and function as a client device 220 by accessing the delivery network 260 and communicating with the host system 210. Furthermore, the IM sender system 205 may include one, some or all of the components and devices described above.

FIG. 4 illustrates a communications system 400 including an IM sender system 205 communicating with an IM recipient system 405 and an IM host system 410 through a communication link 215. Such a communications system may be used by users of IM service providers, such as, for example, AIM, ICQ, Yahoo Messenger, and Microsoft Messenger.

In one implementation, the IM host system 410 may have characteristics similar to those described above with respect to the host system 210, the IM recipient system 405 may have characteristics similar to those described above with respect to the IM sender system 205, and the IM sender system 205 and the IM recipient system 405 may include communication software to enable users of the client systems to access the IM host system 410.

The IM host system 410 may support IM services irrespective of an IM sender's network or Internet access. Thus, the IM host system 410 may allow users to send and receive IMs, regardless of whether they have access to any particular ISP. The IM host system 410 also may support associated services, such as administrative matters, advertising, directory services, chat, and interest groups related to the IM. The IM host system 410 has an architecture that enables the devices (e.g., servers) within the IM host system 410 to communicate with each other. To transfer data, the IM host system 410 employs one or more standard or proprietary IM protocols.

To access the IM host system 410 to begin an IM session in the implementation of FIG. 4, the IM sender system 205 establishes a connection to the IM host system 410. Once a connection to the IM host system 410 has been established, the IM sender system 205 may directly or indirectly transmit data to and access content from the IM host system 410. By accessing the IM host system, an IM sender can use the IM client application to view whether particular users are online, exchange IMs with particular IM recipients, participate in group chat rooms, trade files such as pictures, invitations or documents, find other IM recipients with similar interests, get customized information such as news and stock quotes, and search the Web. IM recipient system 405 may be similarly manipulated to establish contemporaneous connection with IM host system 410.

Once connectivity is established, an IM sender who is using IM sender system 205 may view whether an IM recipient using IM recipient system 405 is online, and typically may view whether the IM recipient is able to receive IMs. If the IM recipient is online, the IM sender may exchange IMs with the IM recipient.

Furthermore, the IM sender may view or perceive certain aspects of a personality selected by a potential IM recipient prior to engaging in communications with that potential IM recipient. For example, certain aspects of an IM recipient selected personality, such as a buddy icon or a miniature buddy icon chosen by the IM recipient, may be perceivable through the buddy list itself prior to engaging in communications. Other aspects of a selected personality chosen by an IM recipient may be made perceivable upon opening of a communication window by the IM sender for a particular IM recipient but prior to initiation of communications.

In one implementation, the IMs sent between IM sender system 205 and IM recipient system 405 are routed through IM host system 410. In another implementation, the IMs sent between IM sender system 205 and IM recipient system 405 are routed through a third party server (not shown), and, in some cases, are also routed through IM host system 410. In yet another implementation, the IMs are sent directly between IM sender system 205 and IM recipient system 405.

As shown in FIG. 4, the IM host system may include a data store 415 for one or more personalities for one or more instant messaging senders. The IM host system may also include a data store 420 for available attributes of personalities. The attributes may include easily selectable items made available to a user while building a personality and as such, are not intended to represent all possible options. The personalities also may be stored locally in a data store 425 at the IM sender system 205.

Figure 5:
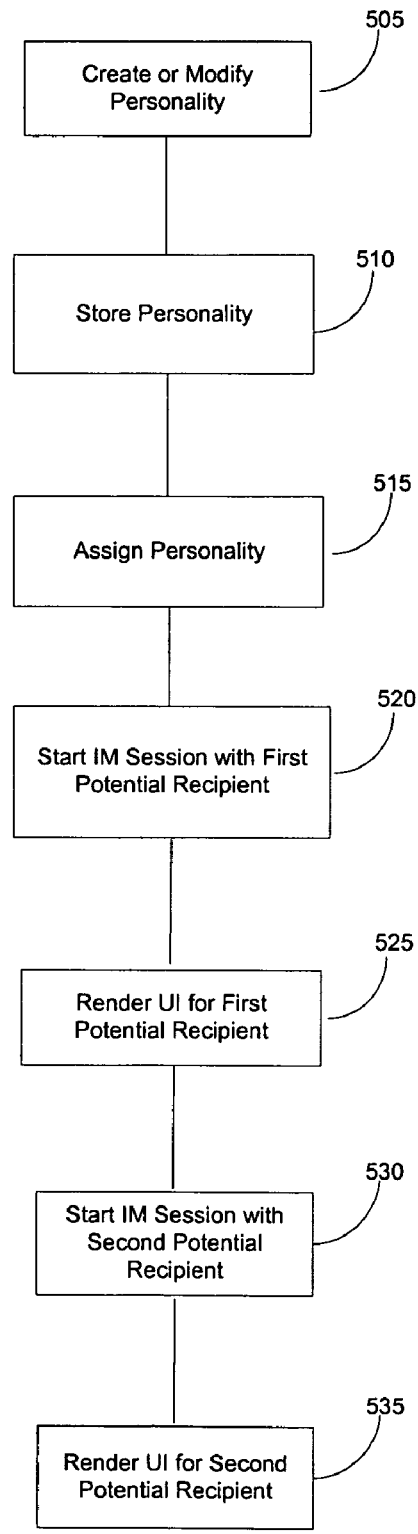
FIGS. 5 and 6 are flow charts of exemplary processes that may be implemented by systems such as those of FIGS. 2-4 and 14.

FIG. 5 shows an exemplary procedure 500 to enable an IM sender to select an online persona to be made perceivable to an IM recipient.

The procedure 500 may be implemented in a client/host context, or a standalone or offline client context. For example, while some functions of procedure 500 may be performed entirely by the IM sender system 205, other functions may be performed by host system 210, or the collective operation of the IM sender system 205 and the host system 210. In procedure 500, the online persona may be respectively selected and rendered by the standalone/offline device, and the online persona may be accessed or updated through a remote device in a non-client/host environment such as, for example, a LAN server serving an end user or a mainframe serving a terminal device. Thus, the procedure 500 described below may be implemented for an OSP, ISP, browser and/or other software program having a graphical user interface, such as programs for instant messaging, chat, electronic mail and stand-alone browsers. Moreover, procedure 500 may be implemented by hardware, software, devices, computers, computer systems, equipment, components, programs, applications, code, storage media, or propagated signals.

Procedure 500 generally involves selecting and projecting an online persona. The IM sender creates or modifies one or more online personalities (step 505). As discussed above with respect to FIG. 1, creating an online persona generally involves the IM sender selecting one or more self-expression items and/or features and functionalities to be displayed to a certain IM recipient or group of IM recipients.

Figure 7:
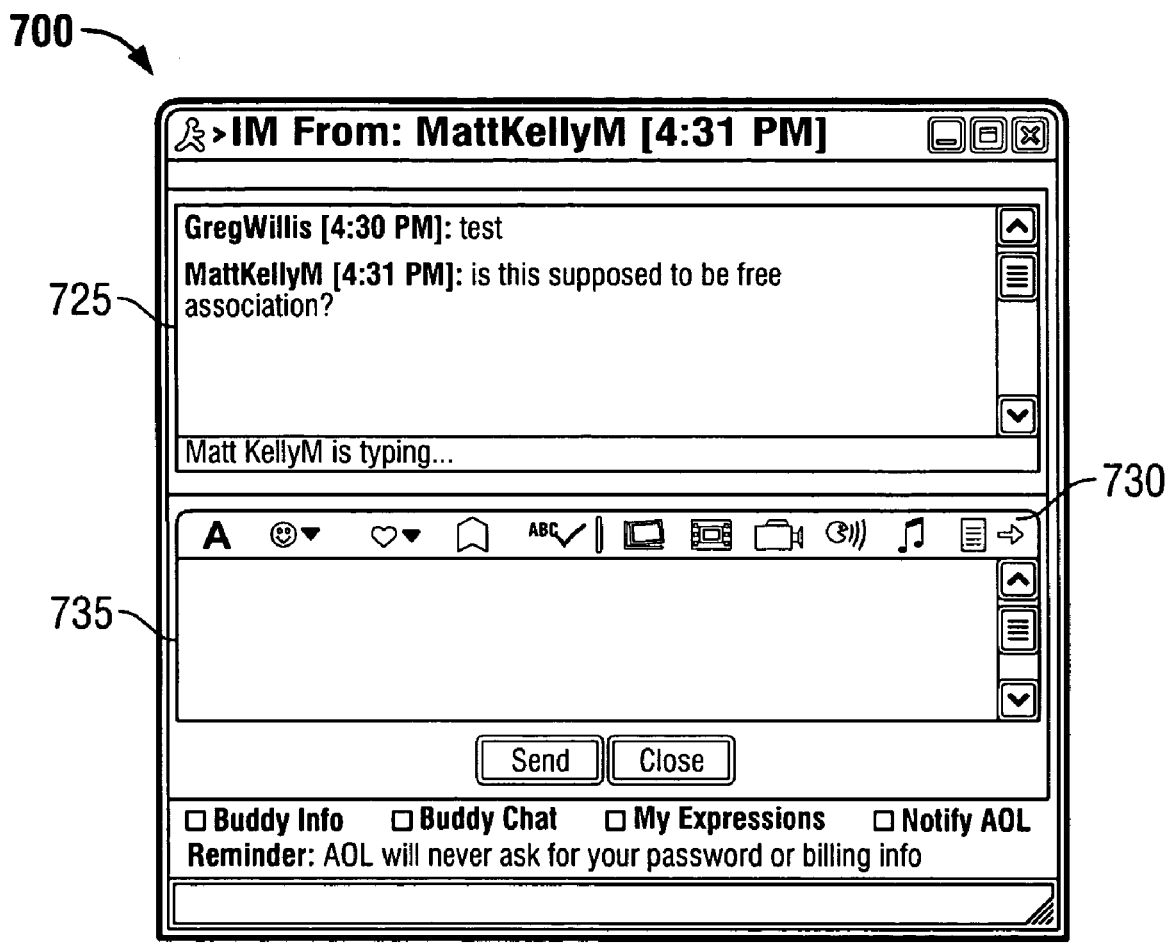
FIGS. 7-12, 13A and 13B are illustrations of different graphical user interfaces that may be implemented by systems such as those of FIGS. 2-4 and 14 when executing a process such as that of FIGS. 5 and 6.

FIG. 7 shows a basic IM user interface (UI) 700A. IM UI 700 has an IM recipient portion 725 and an IM sender portion 735. IM UI 700 also has a set of feature controls 730. As shown, IM UI 700 does not have any self-expression items or any features or functionalities selected.

Figure 8:
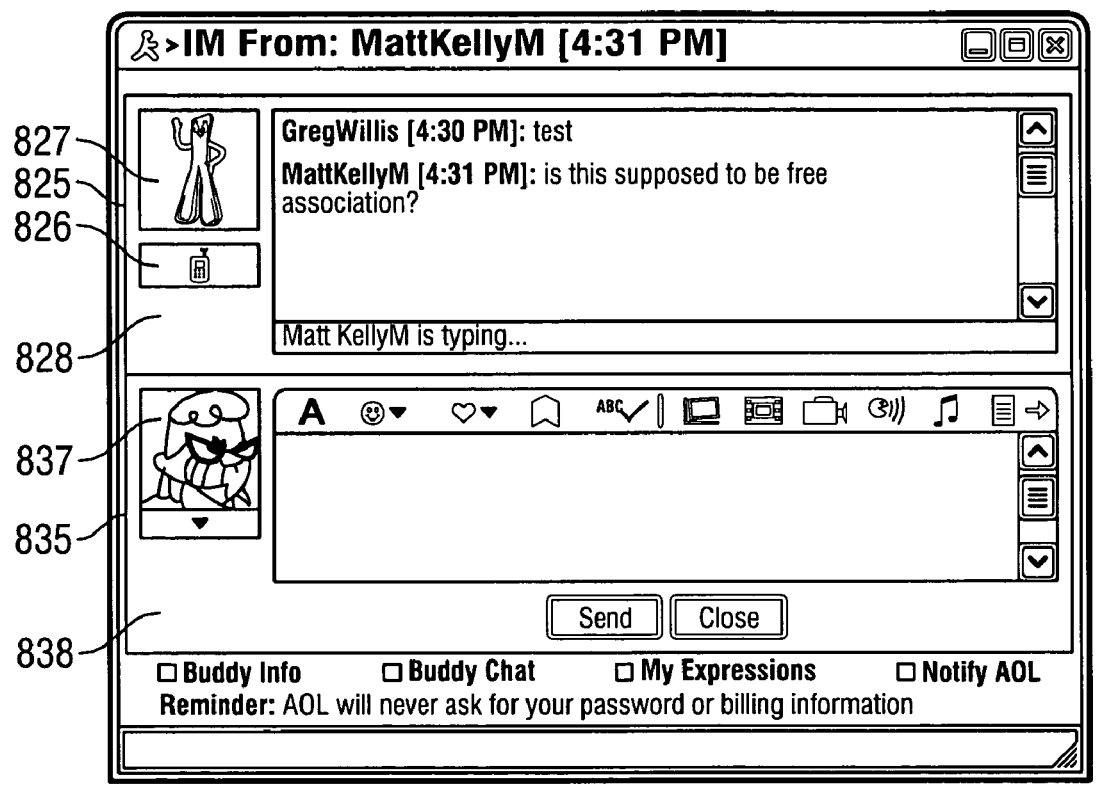

FIG. 8 shows an IM UI 800 with personalization items such as a buddy icon 837 chosen by the IM sender when having an IM conversation with a particular IM recipient, and a buddy icon 827 of the particular IM recipient with whom the IM sender is having an IM conversation. IM UI 800 has an IM recipient portion 825 and an IM sender portion 835. The IM recipient portion 825 displays the buddy icon 827 and wallpaper 828 chosen by the IM recipient with whom the IM sender is having a conversation. The IM recipient portion also contains an icon 826 that indicates that the IM sender is using a mobile device. Upon receipt of such an icon, changes in the personality of the IM sender may be automatically triggered or offered automatically to the IM sender. For example, the IM sender may be presented an option to project a buddy icon or wallpaper that presents better to lower resolution devices or to eliminate self-expressions related to graphics altogether to conserve bandwidth and storage, based on whether the mobile device is capable of rendering such self-expression items to the IM recipient. The IM sender may wish to change other self-expression items or features/functions when an indication is received that the IM recipient is using a mobile device or other devices less capable of handling particular self-expressions items. The IM sender portion 835 contains the buddy icon 837 and wallpaper 838 currently being made perceivable by the IM sender to the IM recipient with whom the IM sender is having an IM conversation.

Figure 9:
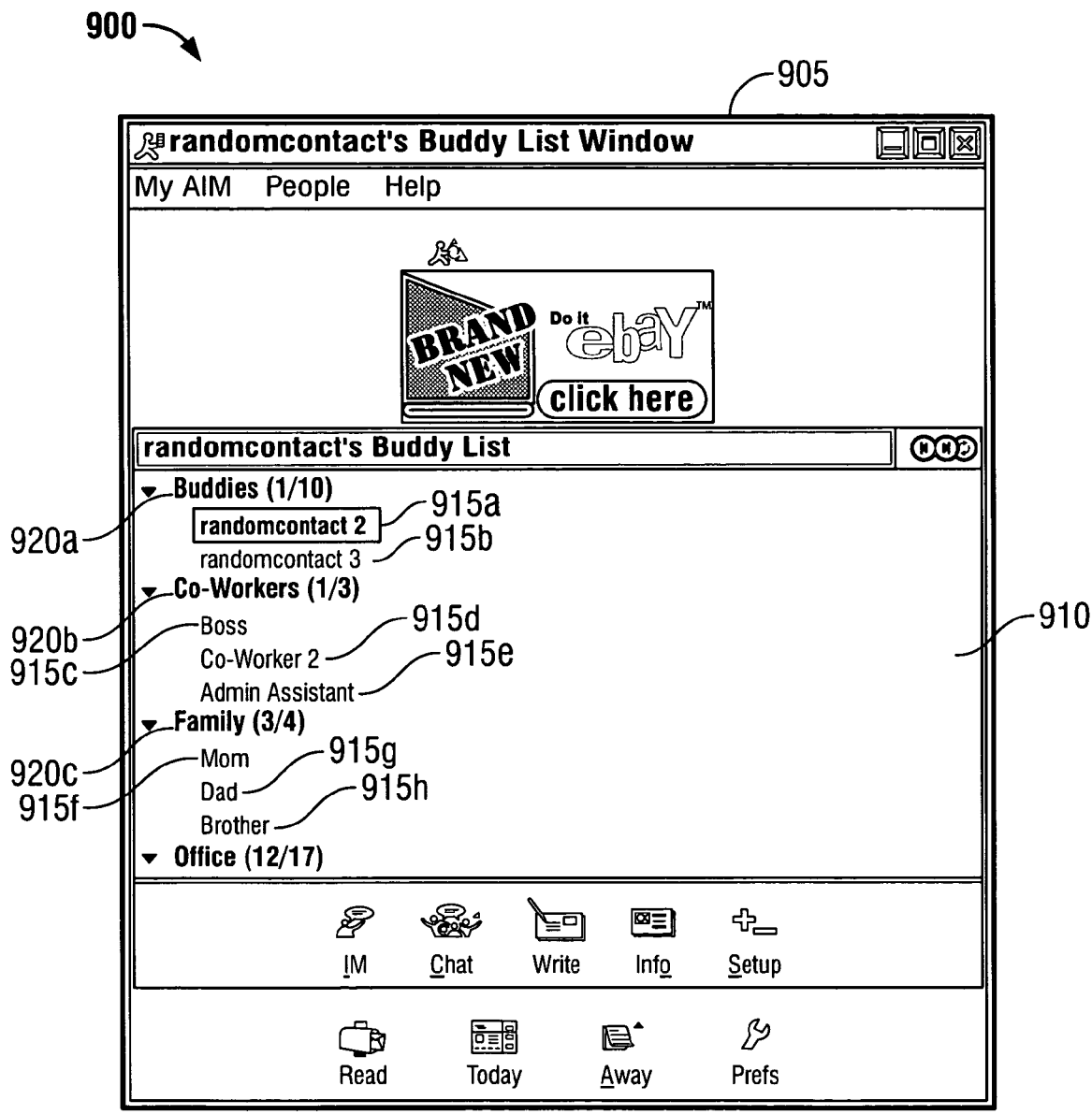

FIG. 9 illustrates a desktop 900 with an exemplary buddy list interface 905 presented to a IM sender (e.g., "randomcontact") when an instant messaging client program is running on a client systems.

In FIG. 9, a desktop 900 is shown with a buddy list user interface 905 of the instant messaging client program. User interface 905 has a box 910 that displays representations 915a-915h of the IM sender's buddies. In the interface 905, the representations 915a-915h are icons showing the screen names of the IM recipients, however, other types or forms of representations may be used. The representations 915a-915h may provide contextual information to the program IM sender about the buddy, such as whether the buddy is online, how long the buddy has been online, whether the buddy is away, or whether the buddy is using a mobile device.

The list of IM recipients displayed in box 910 of user interface 905 typically is referred to as the buddy list. In the buddy list, IM recipients are grouped together into buddy groups. The name or representation of each buddy group is displayed in the buddy list. When a buddy's IM client program is able to receive communications, the representation of the buddy in the buddy list is displayed under the name or representation of the buddy group to which the buddy belongs. For example, in the interface shown by FIG. 9, the buddy whose screen name is "randomcontact2" is part of the Buddies buddy group and, consequently, the representation 915a for randomcontact2 is listed under the representation 920a for the Buddies buddy group. Likewise, the buddy whose screen name is "Boss" is part of the Co-Workers buddy group and, consequently, the representation 915c for Boss is listed under the representation 920b for the Co-Workers buddy group. Similarly, the IM recipients whose screen names are "Mom," "Dad," and "Brother" are part of the Family buddy group 920c and, consequently, their representations 915f-915h are listed under the representation 920c for the Family buddy group.

In creating personalities, the IM sender may forbid a certain personality to be shown to designated IM recipients and/or groups. For example, if the IM sender wants to ensure that the "Casual" personality is not accidentally displayed to the boss or to co-workers, the IM sender may prohibit the display of the "Casual" personality to the boss on an individual basis, and may prohibit the display of the "Casual" personality to the "Co-workers" group on a group basis. An appropriate user interface may be provided to assist the IM sender in making such a selection. Similarly, the IM sender may be provided an option to "lock" a personality to a IM recipient or a group of IM recipients to guard against accidental or unintended personality switching and/or augmenting. Thus, for example, the IM sender may choose to lock the "Work" personality to the boss on an individual basis, or to lock the "Work" personality to the "Co-workers" group on a group basis. In one example, the Casual personality will not be applied to a locked personality. A UI may be provided to assist the IM sender in making such a selection.

Figure 10:
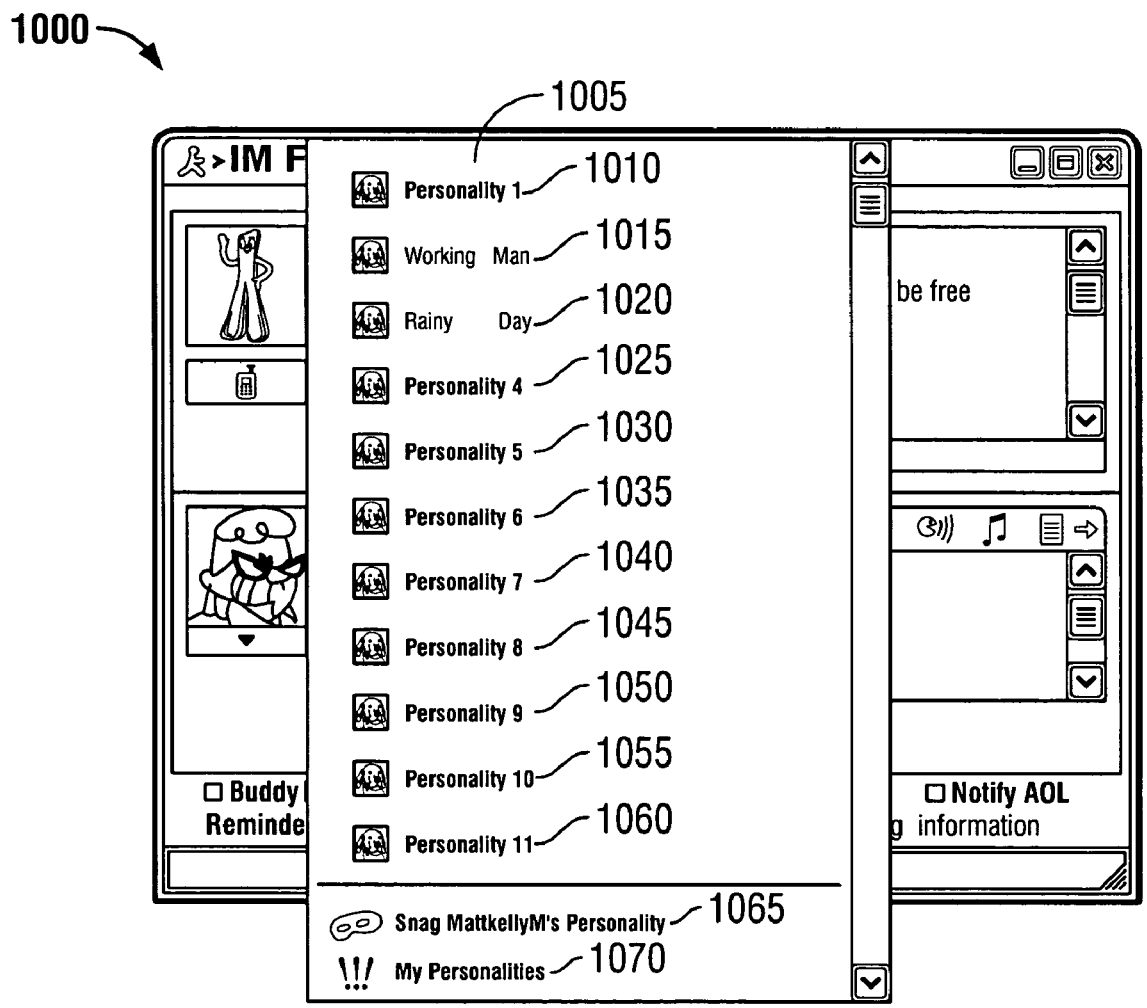

FIG. 10 shows a chooser UI 1000 that enables the IM sender to select among available personalities 1010, 1015, 1020, 1025, 1030, 1035, 1040, 1045, 1050, 1055, 1060. The UI also has a control 1065 to enable the IM sender to "snag" the personality of a buddy, and a control 1070 to review the personality settings currently selected by the IM sender. Through the use of the chooser UI 1000, the user may change the personality being projected to the IM recipient before, during, or after the IM conversation with the recipient.

Figure 11:
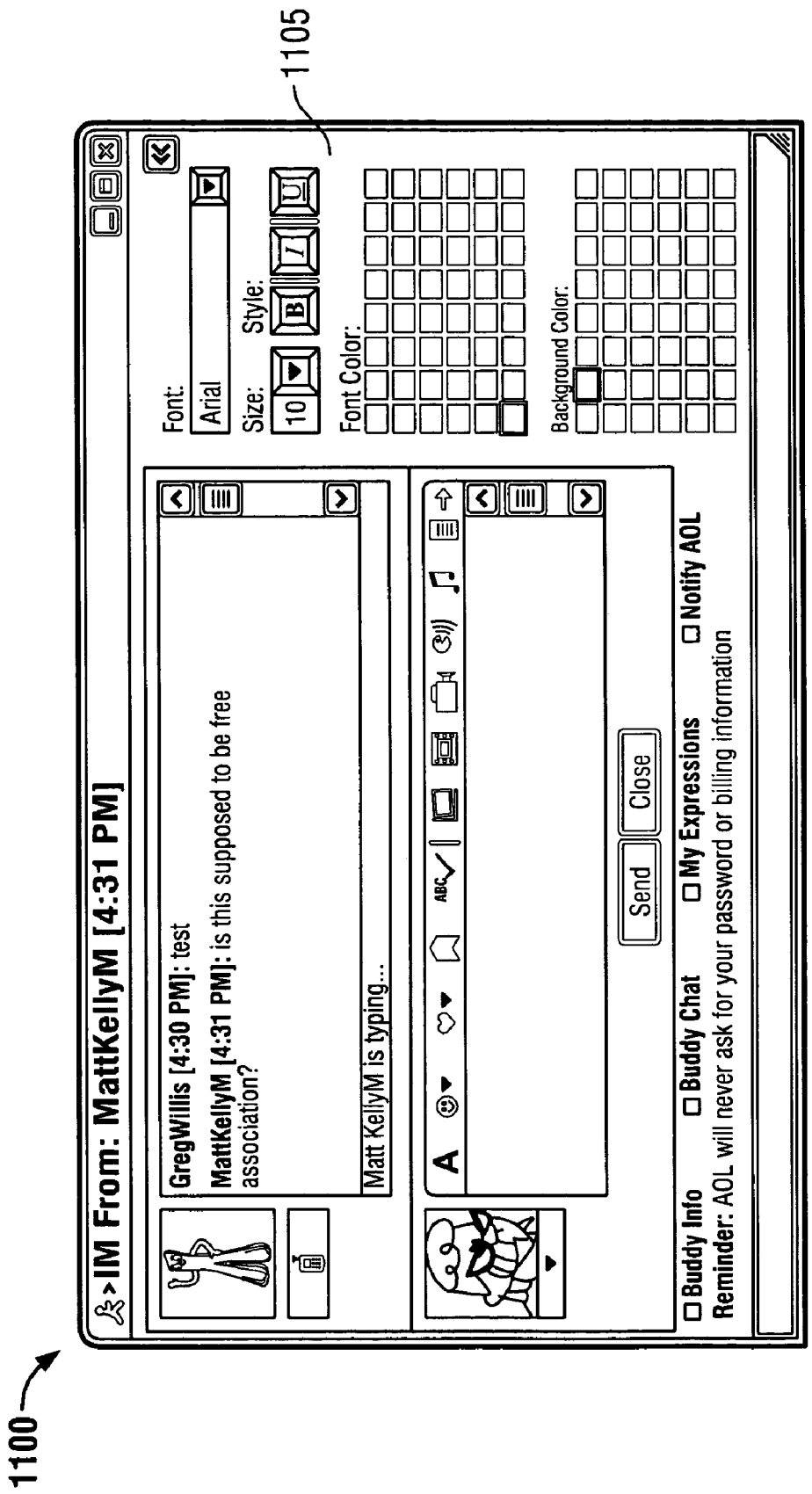

FIG. 11 shows a UI 1100 for font and color adjustments 1105 that a IM sender may employ in creating a personality. Specifically, although shown in the context of an active conversation between an IM sender and an IM recipient, UI 1100 may be used to specify the font and color to be applied to text communicated under the guise of a particular personality, such as those shown at FIG. 10, and to select different fonts/ colors for different of several personalities. The UI 1100 may be invoked by user action such as, for example, right clicking on a mouse button or otherwise manipulating a user input device.

Figure 12A:
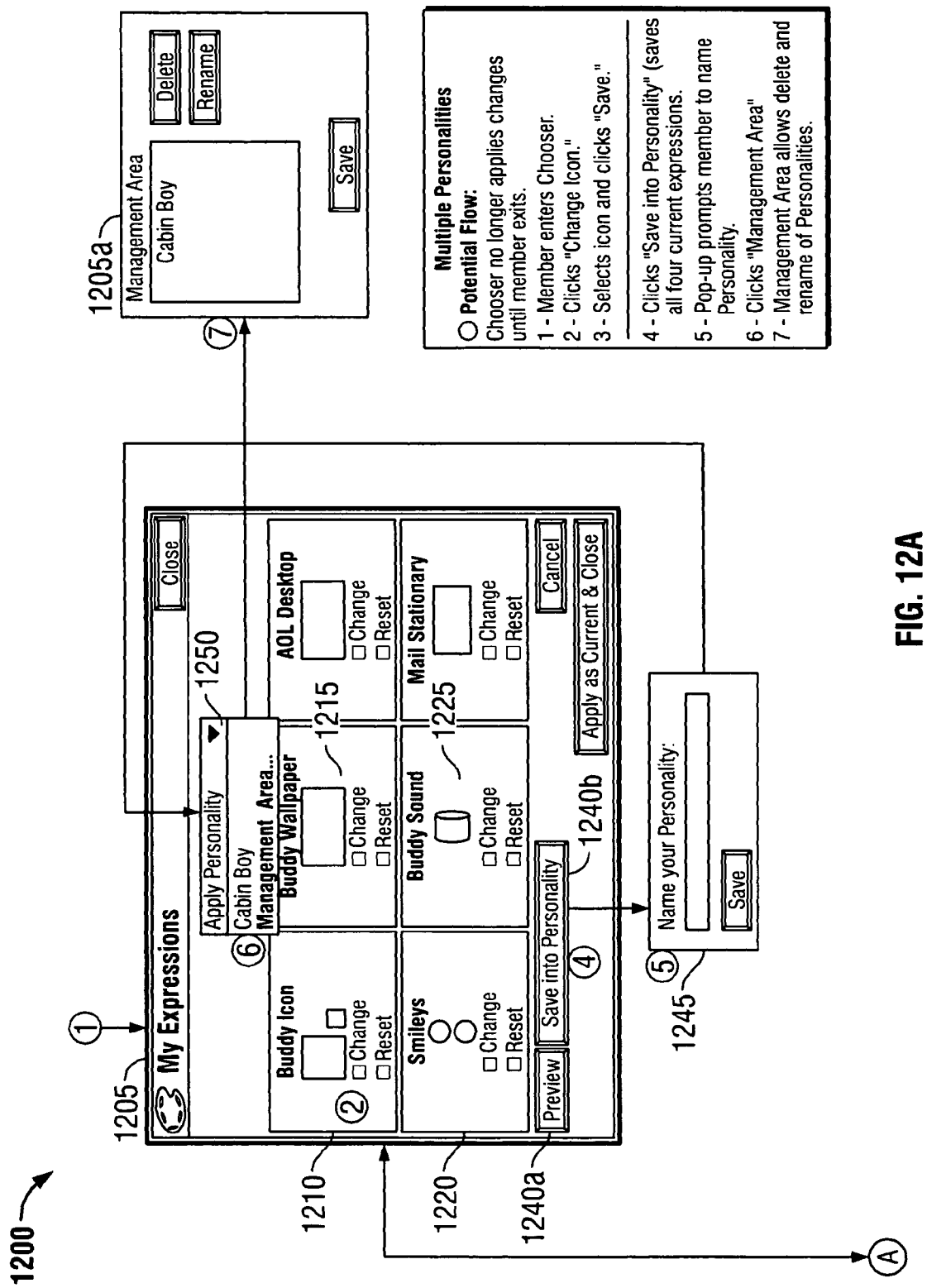
Figure 12B:
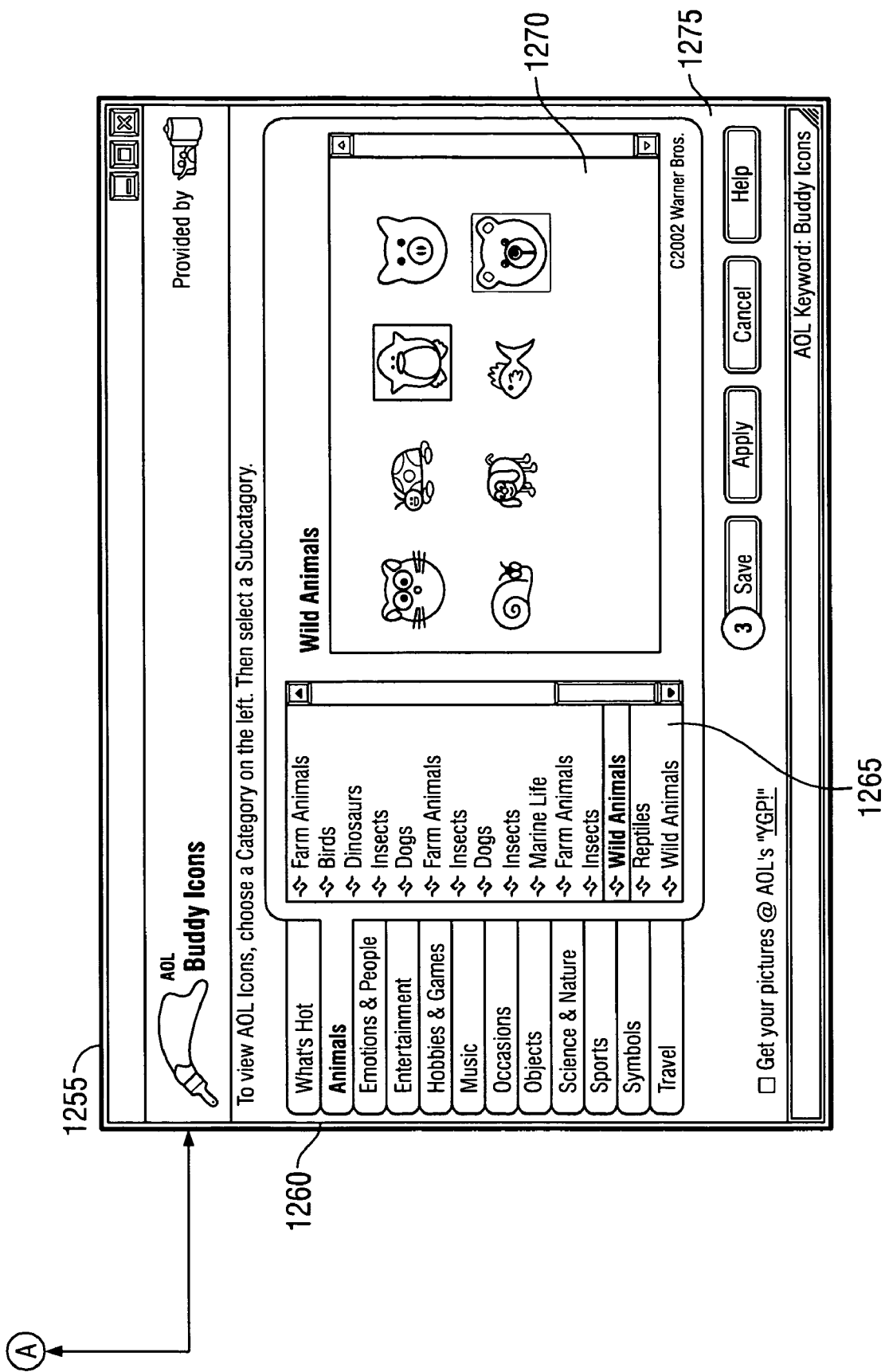
Figure 12C:
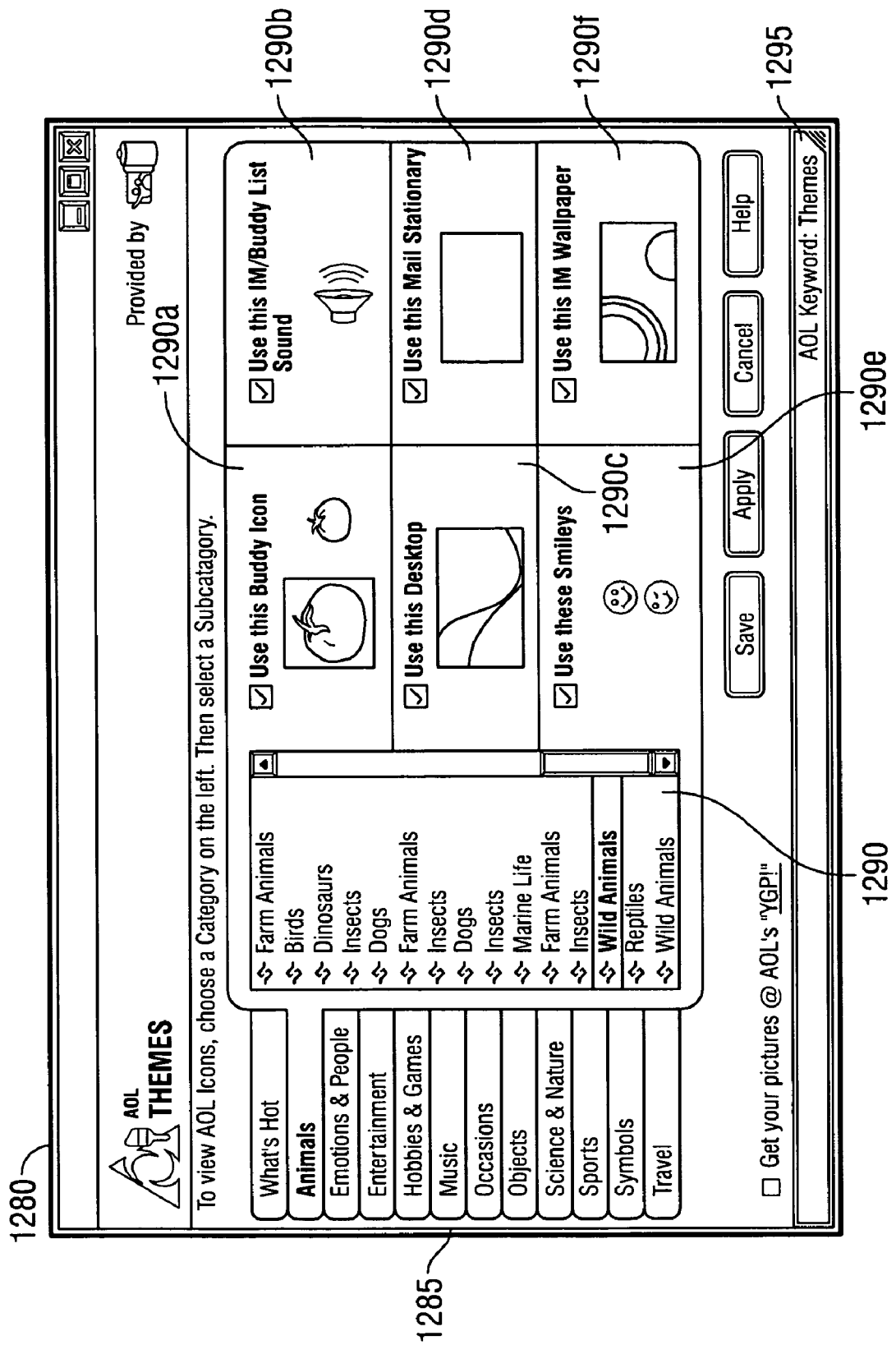

FIG. 12 shows a series 1200 of exemplary UIs 1205, 1255, 1280 for enabling a IM sender to create and store a personality, and/or select various aspects of the personality such as buddy icons, buddy wallpaper, buddy sounds, and smileys. As shown, UI 1205 enables an IM sender to select a set of one or more self-expression items and save the set of self-expression items as a personality. The UI 1205 also enables an IM sender to review and make changes to an IM personality. For example, the UI 1205 enables an IM sender to choose a buddy icon 1210, buddy wallpaper 1215, emoticons 1220, and buddy sounds 1225. A set of controls 1240 is provided to enable the IM sender to preview 1240a the profile and to save

1240*b* these selected self-expression items as a personality. The IM sender is able to name and save the personality 1245 and then is able to apply the personality 1250 to one or more individual IM recipients or one or more groups of IM recipients. A management area 1250*a* is provided to enable the IM sender to delete, save, or rename various IM personalities. In choosing the self-expression items, other interfaces such as UI 1255 may be displayed to enable the IM sender to select the particular self-expression items. UI 1255 includes a set of themes 1260 for buddy icons which enables an IM sender to select a particular theme 1265 and choose an individual icon 1270 in the selected theme. A set of controls 1275 is provided to assist the IM sender in making the selection of self-expression items. Also, an IM sender may be enabled to choose a pre-determined theme, for example, by using a UI 1280. In UI 1280, the IM sender may select various categories 1285 of pre-selected themes and upon selecting a particular category 1290, a set of default pre-selected, self-expression items is displayed, 1290*a*, 1290*b*, 1290*c*, 1290*d*, 1290*e*, and 1290*f*. The set may be unchangeable or the IM sender may be able to individually change any of the pre-selected self-expression items in the set. A control section 1295 is also provided to enable the IM sender to select the themes.

In another implementation, the features or functionality of the IM interface may vary based upon user-selected or pre-selected options for the personality selected or currently in use. The features or functionality may be transparent to the IM sender. For example, when using the "Work" personality, the outgoing IM messages may be encrypted, and a copy may be recorded in a log, or a copy may be forwarded to a designated contact such as an administrative assistant. A warning may be provided to an IM recipient that the IM conversation is being recorded or viewed by others, as appropriate to the situation. By comparison, if the non-professional "Casual" personality is selected, the outgoing IM messages may not be encrypted and no copy is recorded or forwarded.

As a further example, if the "Work" personality is selected and the IM sender indicates an unavailability to receive instant messages (e.g., through selection of an "away" message or by going offline), then messages received from others during periods of unavailability may be forwarded to another IM recipient such as an administrative assistant, or may be forwarded to an e-mail address for the IM sender. By comparison, if the non-professional "Casual" personality is selected, no extra measures are taken to ensure delivery of the message.

In one implementation, the features and functionality associated with the personality would be transparent to the IM sender, and may be based upon one or more pre-selected profiles types when setting up the personality. For example, the IM sender may be asked to choose from a group of personality types such as professional, management, informal, vacation, offbeat, etc. In the example above, the "Work" personality may have been be set up as a "professional" personality type and the "Casual" personality may have been set up as an "informal" personality type. In another implementation, the IM sender may individually select the features and functionalities associated with the personality.

An "enterprise mode" may be provided for use with a personality, and the features and functionality associated with the enterprise mode may be established by an employer or its agent, and may vary depending upon the requirements of the environment. For example, where a record of the IM conversation is being maintained, a legal notice may be provided to one or more of the participants in the IM conversation, where such notice is necessary or desirable. The enterprise mode may enable functionality such as encryption, recording of the IM conversation, and forwarding of the IM conversation to an administrative assistant.

In one implementation, the IM recipient and/or the IM sender may pay a subscription fee to access/use certain personalities, and the personalities may be provided by a third party. In another implementation, the personalities expire and must be replaced after a predetermined event such as a predetermined length of time, passage of a predetermined date, or a predetermined number of uses. Also, a personality may be banned if, for example, it is deemed to be offensive, inappropriate, or to otherwise violate a term of service agreement. If it is determined that the personality is expired or banned, display of such a personality will be disallowed and the IM sender typically will be required to choose a different personality.

Default global personalization items, default group personalization items, or default personal personalization items, may be provided, depending on the implementation. For example, if the Buddies buddy group is provided as a default upon installation of the instant messaging client program, a default group personalization item also may be provided for the Buddies buddy group. As another example, a default global personalization item may be provided when the instant messaging client program is installed so that a personalization item always exists for the IM recipients, regardless of whether a IM sender has selected a personality or personalization item to be presented. Similarly, a default group personalization item may be provided for any default buddy groups and newly created buddy groups, whether or not a global personalization item is provided. This enables a personality to always exist for IM recipients even when no global personalization item or personality exists, regardless of whether a IM sender has set a group personalization item (or personal personalization item, if implemented also). Features and functionality may be assigned to personalities in a similar manner as described with respect to self-expression items.

Referring again to FIG. 5, the personality is then stored (step 510). The personality may be stored on the IM sender system 205, on the IM host system 410, or on a different host system 210 such as a host system of an authorized partner.

Next the IM sender assigns a personality to be projected during future IM sessions or when engaged in future IM conversations with an IM recipient (step 515). The IM sender may wish to display different personalities to different IM recipients and/or groups in the buddy list. The IM sender may use a user interface to assign personalization items to personalities on at least a per-buddy group basis. For example, an IM sender may assign a global buddy icon to all personalities, but assign different buddy sounds on a per-group basis to other personalities (e.g. work, family, friends), and assign buddy wallpaper and smileys on an individual basis to individual personalities corresponding to particular IM recipients within a group. The IM sender may assign other personality attributes based upon the occurrence of certain predetermined events or triggers. For example, certain potential IM recipients may be designated to see certain aspects of the Rainy Day personality if the weather indicates rain at the geographic location of the IM sender. Default priority rules may be implemented to resolve conflicts, or the user may select priority rules to resolve conflicts among personalities being projected or among self-expression items being projected for an amalgamated personality.

For example, a set of default priority rules may resolve conflicts among assigned personalities by assigning the highest priority to personalities and self-expression items of personalities assigned on an individual basis, assigning the next highest priority to assignments of personalities and personalization items made on a group basis, and assigning the lowest priority to assignments of personalities and personalization items made on a global basis. However, the user may be given the option to override these default priority rules and assign different priority rules for resolving conflicts.

Figure 13A:
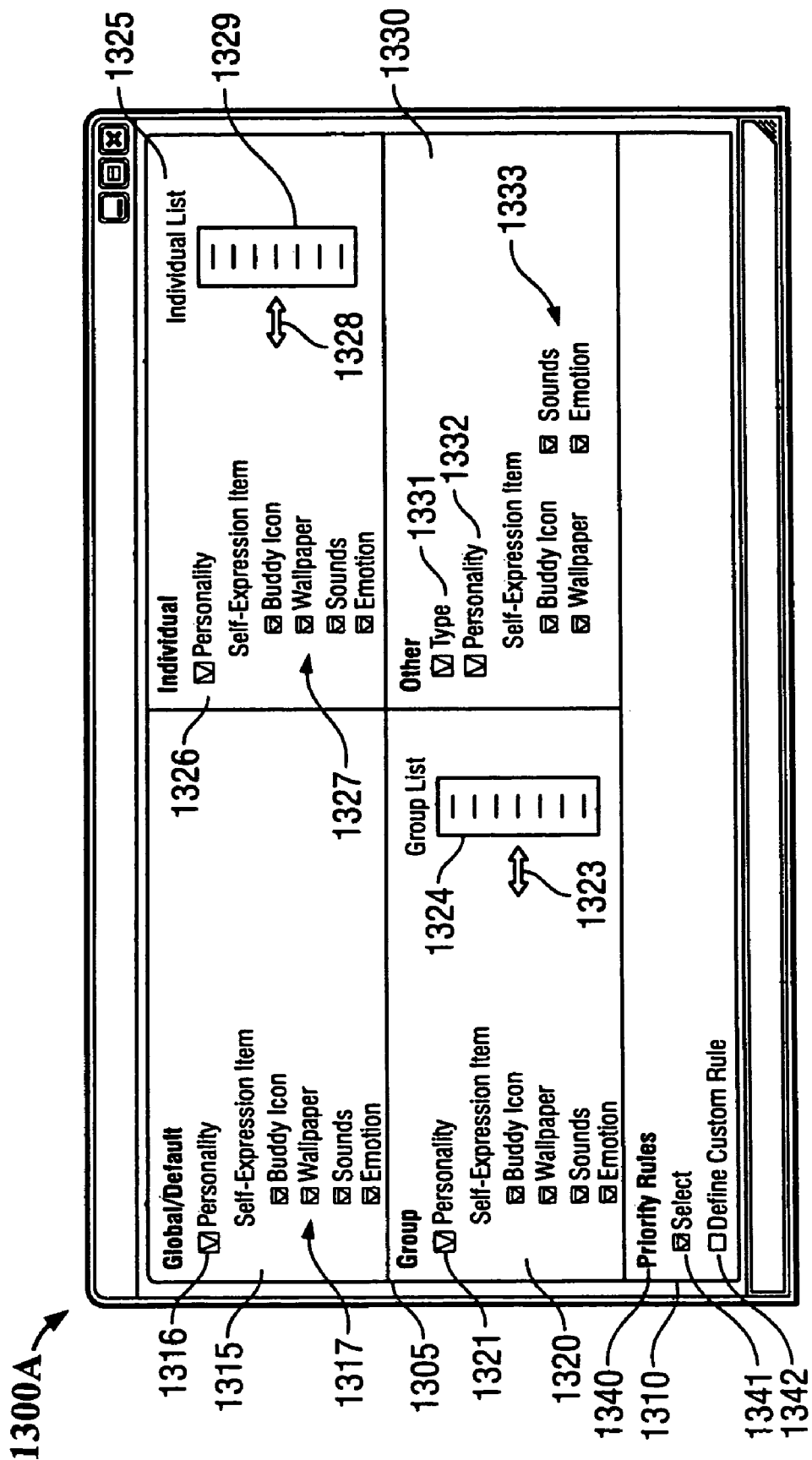

As shown in FIG. 13A, a UI 1300A may be provided to enable the IM sender to assign a persona to be projected and to select rules for resolving conflicts among the personas to be projected. The UI 1300A includes an assignment portion 1305A and a priority rule portion 131A. The assignment portion 1305A includes controls to enable the IM sender to assign a persona as a global or default persona 1315, assign a persona to a group of potential IM recipients 1320, assign a persona to an individual IM recipient 1325, and assign a persona based upon other criteria 1330.

In particular, the global or default controls 1315 may include a drop down menu 1316 to enable the IM sender to select a default persona and may include one or more self-expression drop down menus 1317 to enable the IM sender to select one or more default personalization items to be projected. The group controls 1320 may include a drop down menu 1321 to enable the IM sender to select a persona to be projected to a group and may include one or more self-expression drop down menus 1322 to enable the IM sender to select one or more personalization items to be projected to a group. Association arrows 1323 and a Group list 1324 may be used to match the selected persona and/or self-expression items with a particular group. The individual controls 1325 may include a drop down menu 1326 to enable the IM sender to select a persona to be projected to an individual and may include one or more self-expression drop down menus 1327 to enable the IM sender to select one or more personalization items to be projected to an individual. Association arrows 1328 and an Individual list 1329 may be used to match the selected persona and/or self-expression items with a particular individual. The other criteria controls 1330 may include a drop down menu 1331 to enable the IM sender to select a type of criteria or trigger, a drop down menu 1332 to enable the IM sender to select a persona to be projected based upon other criteria and may include one or more self-expression drop down menus 1333 to enable the IM sender to select one or more personalization items to be projected based on other criteria. The other criteria may include, for example, weather at the IM sender location, a day of the week, a time of day, a holiday, a calendar event, a week day or a weekend day.

The priority rules portion 1310A includes priority rule controls 1340 to enable the IM sender to select priority rules to resolve conflicts between personas or self-expression items or functionality within personas. The controls 1340 may include a drop down menu 1341 to choose pre-defined sets of rules or a UI control 1342 to enable the user to define custom priority rules.

Figure 13B:
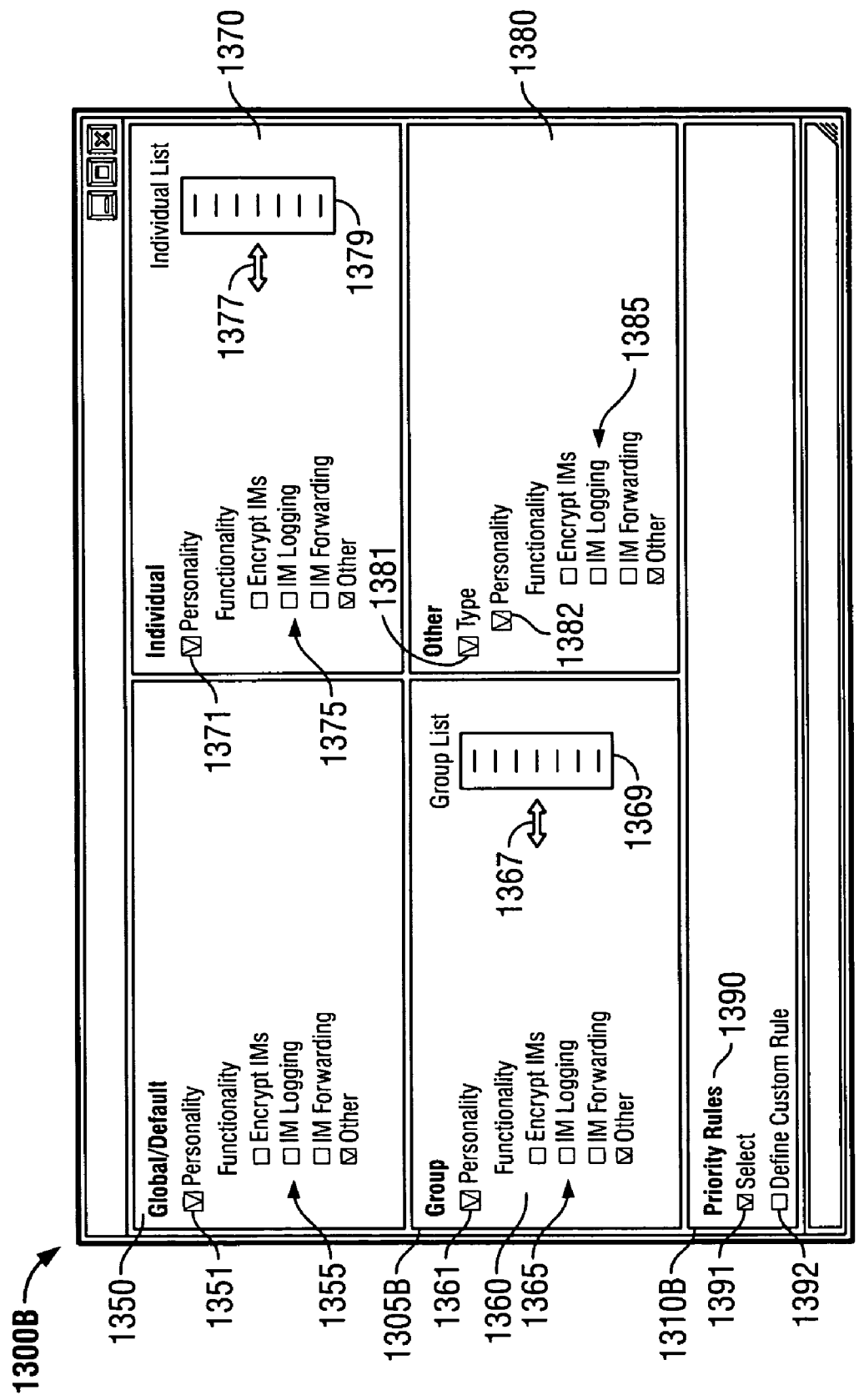

As shown in FIG. 13B, a UI 1300B may be provided to enable the IM sender to assign a persona to be projected and to select rules for resolving conflicts among the personas to be projected. The persona includes functionality that may be selected by the user or selected automatically for the user. The UI 1300B is similar to UI 1300A, and includes an assignment portion 1305B and a priority rule portion 1310B. The assignment portion 1305B includes controls to enable the IM sender to assign a persona as a global or default persona 1350, assign a persona to a group of potential IM recipients 1360, assign a persona to an individual IM recipient 1370, and assign a persona based upon other criteria 1380. Functionality may be assigned to a persona through user manipulation of the UI 1300B, or by default or automatic selection. For example, a personality selected for a "work" buddy list group or buddies within the "work" buddy list group may automatically invoke a recording function by default, whereas a "family" buddy list group may not. The functionality may be assigned by selection or by default buddy list groups provided during installation of the instant messaging client, and may be enabled in response to a suggested configuration setting during installation of the instant messaging client.

In particular, the global or default controls 1350 may include a drop down menu 1351 to enable the IM sender to select a default persona and may include one or more functionality menu items 1355 to enable the IM sender to select one or more default functionalities to be projected with the persona. The group controls 1360 may include a drop down menu 1361 to enable the IM sender to select a persona to be projected to a group and may include one or more functionality menu items 1365 to enable the IM sender to select one or more functionalities to be projected with the persona to a group. Association arrows 1367 and a Group list 1369 may be used to match the selected persona and/or functionalities with a particular group. The individual controls 1370 may include a drop down menu 1371 to enable the IM sender to select a persona to be projected to an individual and may include one or more functionality menu items 1375 to enable the IM sender to select one or more functionalities to be projected with the persona to an individual. Association arrows 1377 and an Individual list 1379 may be used to match the selected persona and/or functionalities with a particular individual. The other criteria controls 1380 may include a drop down menu 1381 to enable the IM sender to select a type of criteria or trigger, a drop down menu 1382 to enable the IM sender to select a persona to be projected based upon other criteria and may include one or more functionality menu items 1385 to enable the IM sender to select one or more functionalities to be projected with the persona based on other criteria. The other criteria may include, for example, weather at the IM sender location, a day of the week, a time of day, a holiday, a calendar event, a week day or a weekend day.

The priority rules portion 1310B includes priority rule controls 1390 to enable the IM sender to select priority rules to resolve conflicts between personas or functionality within personas. The controls 1390 may include a drop down menu 1391 to choose pre-defined sets of rules or a UI control 1392 to enable the user to define custom priority rules.

To set a personality for a buddy-group, the IM sender may use the interface to select the buddy group and assign the personality that will be presented to all IM recipients that belong to the selected buddy group. In other implementations, the IM sender may be able to use the interface to set a global personalization item and/or personality on a per-buddy basis. A global personalization item is typically implemented as a default personalization item sent to a buddy if no other type of personalization item (e.g., buddy icon, buddy wallpaper, buddy sound, or smiley) is set for the buddy on a group or an individual basis. A personalization item may be set for a particular group and used for members of the group, or may be set for an individual buddy and used for that buddy. Typically, an individual (personal) personalization item selection overrides a selection for a group personalization item, and a group personalization item selection overrides a selection for a global personalization item. Similarly, an individual (personal) personality selection overrides a selection for a group personality, and a group personality selection overrides a selection for a global personality.

In some implementations that allow for global personalization items, the group personalization item set for a buddy group optionally may be set by overriding the global personalization item with a new personalization item. For example, if the global buddy icon is set to a bear, and a buddy group personalization item for the "co-worker" group may be set to a beaver, the personalization item presented to IM recipients in the "co-worker" buddy group would be a beaver, while the personalization item presented to IM recipients in other groups would default to the global buddy icon, a bear. Similarly, in some implementations, an individual (personal) personalization item may be set by overriding a group personalization item or a global personalization item for particular IM recipients.

Next, an IM session between the IM sender and the IM recipient is initiated (step 520). The IM session may be initiated by either the IM sender or the IM recipient.

An IM UI is rendered to the IM recipient, configured to project the personality assigned to the IM recipient by the IM sender (step 525), as illustrated, for example, by FIG. 8.

The appropriate personality/personalization item set for a buddy is sent to the buddy when the buddy communicates with the IM sender through the instant messaging client program. For example, in an implementation which supports global personalization items, group personalization items, and personal personalization items, a personal personalization item is sent to the buddy if set, otherwise a group personalization item is sent, if set. If neither a personal nor a group personalization item is set, then the global personalization item is sent. As another example, in an implementation that supports global personalization items and group personalization items, the group personalization item for the group to which the buddy belongs is sent, if set, otherwise the global personalization item is sent. In an implementation that only supports group personalization items, the group personalization item for the group to which the buddy belongs is sent to the buddy.

An IM session between the IM sender and another IM recipient also may be initiated (step 530) by either the IM sender or the second IM recipient.

Relative to the second IM session, a second IM UI is rendered to the second IM recipient, configured to project the personality assigned to the second IM recipient by the IM sender (step 535), as illustrated by FIG. 1 where the IM session are concurrently opened and again by FIG. 8 otherwise. The personality may be projected in a similar manner to that described above with respect to step 525. However, the personality projected to the second IM recipient may differ from the personality projected to the first IM recipient described above in step 525.

Figure 6:
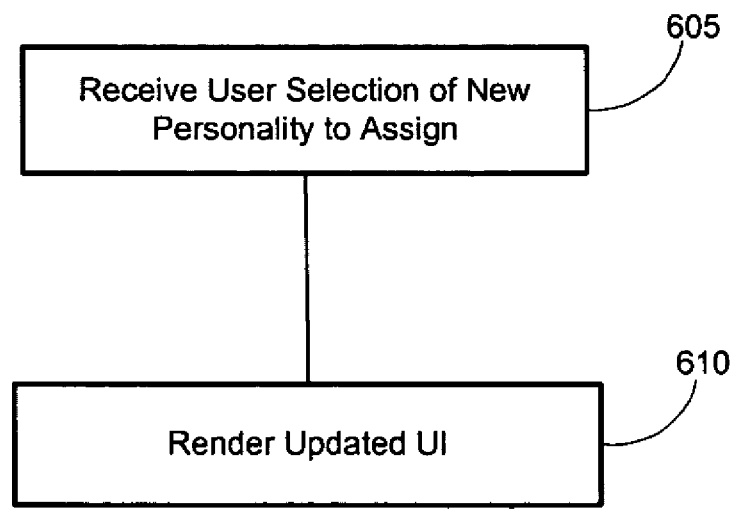

Referring to FIG. 6, an exemplary procedure 600 enables an IM sender to change a personality assigned to an IM recipient. In procedure 600, a user selection of a new personality to be assigned to the IM recipient is received (step 605). The change may be received through an IM chooser 1000, such as that discussed above with respect to FIG. 10, and may include choosing self-expression items and/or features and functionality using such as interface or may include "snagging" a personality of the buddy using such an interface. Snagging a personality refers to the appropriation by the IM sender of one or more personalization items used by the IM recipient. Typically, all personalization items in the personality of the IM recipient are appropriated by the IM sender when "snagging" a personality.

Next, the updated UI for that buddy is updated based on the newly selected personality (step 610).

Figure 14:
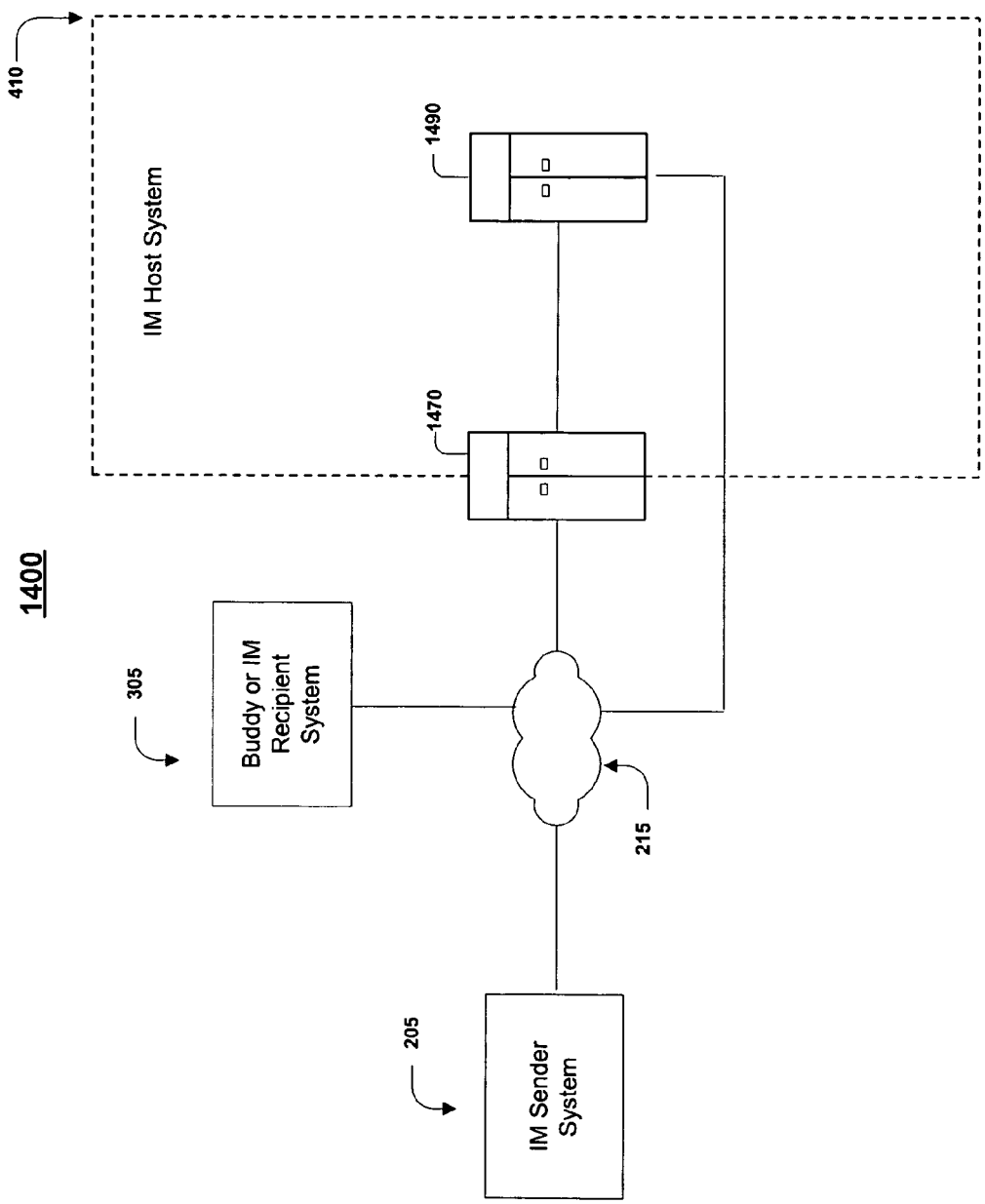

FIG. 14 illustrates a communications system 1400 including an IM sender system 205 communicating with an IM recipient system 405 and an IM host system 410 through a communication link 215. System 1400 illustrates a possible implementation of the communications system 400 of FIG. 4.

In system 1400, the IM host system 410 includes a login server 1470 for enabling access by IM senders and routing communications between the IM sender system 205 and other elements of the IM host system 410. The IM host system 410 also includes an IM server 1490. To enable access to and facilitate interactions with the IM host system 410, the IM sender system 205 and the IM recipient system 405 may include communication software, such as for example, an OSP client application and/or an IM client application.

As described with respect to FIG. 4, the IM host system 410 may support IM services irrespective of an IM sender's network or Internet access. Thus, the IM host system 410 may allow IM senders to send and receive IMs, regardless of whether they have access to any particular ISP. The IM host system 410 also may support associated services, such as administrative matters, advertising, directory services, chat, and interest groups related to the IM. The IM host system 410 has an architecture that enables the devices (e.g., servers) within the IM host system 410 to communicate with each other. To transfer data, the IM host system 410 employs one or more standard or exclusive IM protocols.

In one implementation, the IM sender system 205 establishes a connection to the login server 1470 in order to access the IM host system 410 and begin an IM session. The login server 1470 typically determines whether the particular IM sender is authorized to access the IM host system 410 by verifying the IM sender's identification and password. If the IM sender is authorized to access the IM host system 410, the login server 1470 usually employs a hashing technique on the IM sender's screen name to identify a particular IM server 1490 within the IM host system 410 for use during the IM sender's session. The login server 1470 provides the IM sender (e.g., IM sender system 205) with the IP address of the IM server 1490, gives the IM sender system 205 an encrypted key, and breaks the connection. The IM sender system 205 then uses the IP address to establish a connection to the particular IM server 1490 through the communications link 215, and obtains access to the IM server 1490 using the encrypted key. Typically, the IM sender system 205 will be able to establish an open TCP connection to the IM server 1490. The IM recipient system 405 establishes a connection to the IM host system 310 in a similar manner.

In one implementation, the IM sender system 205 may directly or indirectly transmit data to and access content from the IM server 1490 once a connection to the IM server 1490 has been established. By accessing the IM server, an IM sender can leverage the IM client application to determine whether particular IM senders ("buddies" or potential IM recipients) are online, exchange IMs with particular IM recipients, participate in group chat rooms, trade files such as pictures, invitations or documents, find other IM recipients with similar interests, get customized news and stock quotes, and search the Web. For example an IM sender who is using IM sender system 205 may view whether a buddy using IM recipient system 405 is online, and if so, may exchange IMs with that buddy. In one implementation, the IMs sent between IM sender system 205 and IM recipient system 405 are routed through IM host system 410. In another implementation, the IMs sent between IM sender system 205 and IM recipient system 405 are routed through a third party server (not shown) and, in some cases, are also routed through IM host system 410. In yet another implementation, the IMs are sent directly between IM sender system 205 and IM recipient system 405.

In one implementation, the IM host system 410 also includes a user profile server (not shown) connected to a database (not shown) for storing large amounts of user profile data. The user profile server may be used to enter, retrieve, edit, manipulate, or otherwise process user profile data. In one implementation, an IM sender's profile data includes, for example, the IM sender's screen name, buddy list, identified interests, and geographic location. The IM sender's profile data may also include self-expression items selected by the IM sender. The IM sender may enter, edit and/or delete profile data using an installed IM client application on the IM sender system 205 to interact with the user profile server.

Because the IM sender's data are stored in the IM host system 410, the IM sender does not have to reenter or update such information in the event that the IM sender accesses the IM host system 410 using a new or different IM sender system 205. Accordingly, when an IM sender accesses the IM host system 410, the IM server can instruct the user profile server to retrieve the IM sender's profile data from the database and to provide, for example, the IM sender's self-expression items and buddy list to the IM server. Alternatively, user profile data may be saved locally on the IM sender system 205.

Instant messaging programs typically allow IM senders to communicate in real-time with each other in a variety of ways. For example, many instant messaging programs allow IM senders to send text as an instant message, to transfer files, and to communicate by voice. Examples of IM communications exist over AIM (America Online Instant Messenger), AOL (America Online) Buddy List and Instant Messages, Yahoo Messenger, MSN Messenger, and ICQ, among others. Although discussed above primarily with respect to IM applications, other implementations are contemplated for providing similar functionality in platforms and online applications such as chat, e-mail, and streaming media applications.

Other implementations are within the scope of the following claims. For example, although the examples above are given in an instant message context, other communications systems with similar attributes may be used. For example, multiple personalities may be used in a chat room or in e-mail communications. Also, the user interface may be a viewable interface, an audible interface, a tactile interface, or a combination of these.

What is claimed is:

1. A user interface on a display device that enables perception of communications that leverage an instant messaging platform, the user interface on the display device comprising:
   a module, being executed on a processor of the display device, for identifying at least two identities within an instant messaging communications environment to whom messages may be directed;
   a module for associating a first persona, a second persona, and a third persona with a single textual identifier of a user, the single textual identifier used to represent the user in the instant messaging communications environment;
   a module for associating an attribute of said first persona of the single textual identifier with a first functionality;
   a module for associating an attribute of said second persona of the single textual identifier with a second functionality, the second functionality differing from the first functionality;
   a module for associating an attribute of said third persona of the single textual identifier with a third functionality, the third functionality differing from the first functionality and the second functionality;
   a module for rendering an instant messaging application user interface for a first instant messaging communications session involving the single textual identifier of the user and a first identity and a second instant messaging communications session involving the single textual identifier of the user and a second identity, the user interface being presented at a system display presented to the user;
   a module for associating the first persona of the single textual identifier with the first identity;
   a module for associating the second persona and the third persona of the single textual identifier with the second identity;
   a module for identifying a conflict between the attribute of the second persona and the attribute of the third persona;
   a module for resolving the identified conflict between the attribute of the second persona and the attribute of the third persona, and for generating a resolved attribute based on the resolution of the conflict between the attribute of the second persona and the attribute of the third persona; and
   a module for projecting the first persona of the user to the first identity while concurrently projecting the resolved attribute to the second identity.

2. The user interface of claim 1 wherein the first functionality comprises encrypting messages sent by the user during the first instant messaging communications session.

3. The user interface of claim 2 wherein the second functionality comprises not encrypting messages sent by the user during the second instant messaging communications session.

4. The user interface of claim 1 wherein the first functionality comprises decrypting messages received by the user during the first instant messaging communications session.

5. The user interface of claim 4 wherein the second functionality comprises not decrypting messages received by the user during the second instant messaging communications session.

6. The user interface of claim 1 wherein the first functionality comprises logging messages sent and received by the user during the first instant messaging communications session.

7. The user interface of claim 6 wherein the second functionality comprises not logging messages sent and received by the user during the second instant messaging communications session.

8. The user interface of claim 6 wherein the first functionality further comprises providing a notification concerning the message logging by the user to the first of the identities.

9. The user interface of claim 8 wherein the second functionality comprises not providing a notification concerning the message logging by the user to the second of the identities.

10. The user interface of claim 1 wherein the first functionality comprises determining a routing of a message received by the user during the first instant messaging communications session.

11. The user interface of claim 10 wherein determining the routing comprises determining a routing of the message over a communications mode other than the communications mode over which the message was received.

12. The user interface of claim 10 further comprising routing the message using the determined routing.

13. The user interface of claim 12 wherein routing the message comprises forwarding the message to a different user.

14. The user interface of claim 13 wherein forwarding the message comprises forwarding the message via e-mail.

15. The user interface of claim 10 wherein the first functionality further comprises providing a notification concerning the message routing to the first of the identities.

16. The user interface of claim 10 wherein determining the routing comprises determining the routing based upon an online presence state of the single textual identifier.

17. The user interface of claim 10 wherein the second functionality comprises not determining a routing of a message received by the user during the second instant messaging communications session.

18. The user interface of claim 1 wherein the first persona and the second persona each include at least one shared functionality.

19. The user interface of claim 18 wherein the shared functionality comprises logging messages sent and received by the user during the first and the second instant messaging communications sessions.

20. The user interface of claim 19 wherein the first functionality comprises encrypting messages sent by the user during the first instant messaging communications session and the second functionality comprises not encrypting messages sent by the user during the second instant messaging communications session.

21. The user interface of claim 18 wherein the shared functionality comprises encrypting messages sent by the user during the first and the second instant messaging communications sessions.

22. The user interface of claim 21 wherein the first functionality comprises logging messages sent and received by the user during the first instant messaging communications session and the second functionality comprises not logging messages sent and received by the user during the second instant messaging communications session.

23. The user interface of claim 1 further comprising a module for associating the first persona with a first group of identities such that the first persona is projected to members of the first group of identities in a communications session, wherein the first of the identities is included within the first group of identities.

24. The user interface of claim 23 further comprising a module for associating the second persona with a second group of identities such that the second persona is projected to members of the second group of identities in a communications session, wherein the second of the identities is included within the second group of identities.

25. The user interface of claim 1 wherein the second persona is a group persona associated with a group of identities with which the second of the identities is associated, and the third persona is a global persona associated with each one of the at least two identities.

26. The user interface of claim 25 wherein the module for resolving the identified conflict between the attribute of the second persona and the attribute of the third persona comprises a module for determining that the attribute of the second persona overrides the attribute of the third persona, and wherein a module for projecting the first persona of the single textual identifier to the first identity while concurrently projecting the resolved attribute to the second identity comprises a module for projecting the attribute of the second persona to the second identity.

27. The user interface of claim 1 wherein the communications session comprises an instant messaging communications session.

28. The user interface of claim 27 wherein the identities are members of a buddy list, the buddy list including the online presence state of the identities.

29. The user interface of claim 1 further comprising a module for projecting the functionality of the first persona of the single textual identifier to the first of the identities while concurrently projecting the functionality of the second persona of the same single textual identifier to the second of the identities.

30. The user interface of claim 29 further comprising a module for selecting among the first and second personas for projection to a particular one of the identities based on an attribute of the particular identity.

31. The user interface of claim 1 further comprising a module for receiving from the user a selection of at least the first and second personas.

32. The user interface of claim 1 further comprising a module for selecting functionality of the first persona based upon an attribute of the first identity.

33. The user interface of claim 1 further comprising a module for configuring the functionality of the first persona assigned to the first identity to change based upon the occurrence of a predetermined event.

34. The user interface of claim 1 wherein the module for projecting the first persona of the single textual identifier to the first identity while concurrently projecting the resolved attribute to the second identity is configured to project the first persona to the first identity and the resolved attribute to the second identity prior to communication of an instant message between the user and the first and second identities.

35. The user interface of claim 1 further comprising a module for displaying the first persona, the second persona, and the third persona of the single textual identifier for perception on instant message recipient lists that reveal presence of the single textual identifier.

36. The user interface of claim 1 wherein the first persona, the second persona, and the third persona differ in at least one aspect that is displayably projected.

37. A computer implemented method for enabling perception of multiple online personas in an instant messaging communications session, the method comprising:
identifying, by a processor of the computer, at least two identities within a communications environment to whom messages may be directed;
associating a first persona, a second persona, and a third persona with a single textual identifier of a user, the single textual identifier used to represent the user in the instant messaging communications environment;
associating an attribute of said first persona of the single textual identifier with a first functionality;
associating an attribute of said second persona of the single textual identifier with a second functionality, the second functionality differing from the first functionality;
associating an attribute of said third persona of the single textual identifier with a third functionality, the third functionality differing from the first functionality and the second functionality;
associating the first persona of the single textual identifier with the first identity;
associating the second persona and the third persona of the single textual identifier with the second identity;
identifying a conflict between the attribute of the second persona and the attribute of the third persona;
resolving the identified conflict between the attribute of the second persona and the attribute of the third persona, and generating a resolved attribute based on the resolution of the conflict between the attribute of the second persona and the attribute of the third persona; and
projecting, based on the association of the first persona with the first identity, the first persona of the single textual identifier to a first of the identities while concurrently projecting, based on the association of the second persona and the third persona of the single textual identifier with the second identity, the resolved attribute to the second of the identities.

38. The method of claim 37 wherein the first functionality comprises encrypting messages sent by the user during an instant messaging communication session with the first of the identities.

39. The method of claim 38 wherein the second functionality comprises not encrypting messages sent by the user during an instant messaging communication session with the second of the identities.

40. The method of claim 37 wherein the first functionality comprises decrypting messages received by the user during an instant messaging communication session with the first of the identities.

41. The method of claim 40 wherein the second functionality comprises not decrypting messages received by the user during an instant messaging communication session with the second of the identities.

42. The method of claim 37 wherein the first functionality comprises logging messages sent and received by the user during an instant messaging communication session with the first of the identities.

43. The method of claim 42 wherein the second functionality comprises not logging messages sent and received by the user during an instant messaging communication session with the second of the identities.

44. The method of claim 42 wherein the first functionality further comprises providing a notification concerning the message logging by the user to the first of the identities.

45. The method of claim 43 wherein the second functionality comprises not providing a notification concerning the message logging by the user to the second of the identities.

46. The method of claim 37 wherein the first functionality comprises determining a routing of a message received by the user during an instant messaging communications with the first of the identities.

47. The method of claim 46 wherein determining the routing comprises determining a routing of the message over a communications mode other than the communications mode over which the message was received.

48. The method of claim 46 further comprising routing the message using the determined routing.

49. The method of claim 48 wherein routing the message comprises forwarding the message to a different user.

50. The method of claim 49 wherein forwarding the message comprises forwarding the message via e-mail.

51. The method of claim 46 wherein the first functionality further comprises providing a notification concerning the message routing to the first of the identities.

52. The method of claim 46 wherein determining the routing comprises determining the routing based upon an online presence state of the single textual identifier.

53. The method of claim 46 wherein the second functionality comprises not determining a routing of a message received by the user during an instant messaging communications with the second of the identities.

54. The method of claim 37 wherein the first persona and the second persona each include at least one shared functionality.

55. The method of claim 54 wherein the shared functionality comprises logging messages sent and received by the user during an instant messaging communication session with the first of the identities and the second of the identities.

56. The method of claim 55 wherein the first functionality comprises encrypting messages sent by the user during an instant messaging communication session with the first of the identities and the second functionality comprises not encrypting messages sent by the user during an instant messaging communication session with the second of the identities.

57. The method of claim 54 wherein the shared functionality comprises encrypting messages sent by the user during an instant messaging communication session with the first of the identities and the second of the identities.

58. The method of claim 57 wherein the first functionality comprises logging messages sent and received by the user during an instant messaging communication session with the first of the identities and the second functionality comprises not logging messages sent and received by the user during an instant messaging communication session with the second of the identities.

59. The method of claim 37 further comprising associating the first persona with a first group of identities such that the first persona is projected to members of the first group of identities in a communications session, wherein the first of the identities is included within the first group of identities.

60. The method of claim 59 further comprising associating the second persona with a second group of identities such that the second persona is projected to members of the second group of identities in a communications session, wherein the second of the identities is included within the second group of identities.

61. The method of claim 37 wherein the second persona is a group persona associated with a group of identities with which the second of the identities is associated, and the third persona is a global persona associated with each one of the at least two identities.

62. The method of claim 61 wherein the resolving the identified conflict between the attribute of the second persona and the attribute of the third persona comprises determining that the attribute of the second persona overrides the attribute of the third persona, and wherein projecting the first persona of the single textual identifier to the first identity while concurrently projecting the resolved attribute to the second identity comprises projecting the attribute of the second persona to the second identity.

63. The method of claim 37 wherein the communications session comprises an instant messaging communications session.

64. The method of claim 63 wherein the identities are members of a buddy list, the buddy list including the online presence state of the identities.

65. The method of claim 37 further comprising projecting the functionality of the first persona of the single textual identifier to the first of the identities while concurrently projecting the functionality of the second persona of the same single textual identifier to the second of the identities.

66. The method of claim 65 further comprising selecting among the first and second personas for projection to a particular one of the identities based on an attribute of the particular identity.

67. The method of claim 37 further comprising receiving from the user a selection of at least the first and second personas.

68. The method of claim 37 further comprising selecting functionality of the first persona based upon an attribute of the first identity.

69. The method of claim 37 further comprising configuring the functionality of the first persona assigned to the first identity to change based upon the occurrence of a predetermined event.

70. A non-transitory computer readable storage medium encoded with a computer program comprising instructions that, when executed on a processor of a computer, operate to cause the processor to perform operations comprising:
identifying at least two identities within a communications environment to whom messages may be directed;
associating a first persona, a second persona, and a third persona with a single textual identifier of a user, the single textual identifier used to represent the user in the instant messaging communications environment;
associating an attribute of said first persona of the single textual identifier with a first functionality;
associating an attribute of said second persona of the same single textual identifier with a second functionality, the second functionality differing from the first functionality;
associating an attribute of said third persona of the single textual identifier with a third functionality, the third functionality differing from the first functionality and the second functionality;
associating the first persona of the single textual identifier with the first identity;
associating the second persona and the third persona of the single textual identifier with the second identity;
identifying a conflict between the attribute of the second persona and the attribute of the third persona;
resolving the identified conflict between the attribute of the second persona and the attribute of the third persona, and for generating a resolved attribute based on the resolution between of the conflict the attribute of the second persona and the attribute of the third persona; and
projecting, based on the association of the first persona with the first identity, the first persona of the single textual identifier to a first of the identities while concurrently projecting, based on the association of the second persona and the third persona of the single textual identifier with the second identity, the resolved attribute to the second of the identities.

71. The computer readable storage medium of claim 70 wherein the first functionality comprises encrypting messages sent by the user during an instant messaging communication session with the first of the identities.

72. The computer readable storage medium of claim 70 wherein the first functionality comprises decrypting messages received by the user during an instant messaging communication session with the first of the identities.

73. The computer readable storage medium of claim 70 wherein the first functionality comprises logging messages sent and received by the user during an instant messaging communication session with the first of the identities.

74. The computer readable storage medium of claim 73 wherein the first functionality further comprises providing a notification concerning the message logging by the user to the first of the identities.

75. The computer readable storage medium of claim 70 wherein the first functionality comprises determining a routing of a message received by the user during an instant messaging communications with the first of the identities.

76. The computer readable storage medium of claim 75 wherein instructions for determining the routing comprise instructions for determining a routing of the message over a communications mode other than the communications mode over which the message was received.

77. The computer readable storage medium of claim 75 wherein the first functionality further comprises providing a notification concerning the message routing to the first of the identities.

78. The computer readable storage medium of claim 75 wherein instructions for determining the routing comprise instructions for determining the routing based upon an online presence state of the user.

79. The computer readable storage medium of claim 70 wherein the first persona and the second persona each include at least one shared functionality.

80. The computer readable storage medium of claim 70 further comprising instructions for associating the first persona with a first group of identities such that the first persona is projected to members of the first group of identities in a communications session, wherein the first of the identities is included within the first group of identities.

81. The computer readable storage medium of claim 80 further comprising instructions for associating the second persona with a second group of identities such that the second persona is projected to members of the second group of identities in a communications session, wherein the second of the identities is included within the second group of identities.

82. The computer readable storage medium of claim 70 wherein the second persona is a group persona associated with a group of identities with which the second of the identities is associated, the third persona is a global persona associated with each one of the at least two identities.

83. The computer readable storage medium of claim 82 wherein the resolving the identified conflict between the attribute of the second persona and the attribute of the third persona comprises determining that the attribute of the second persona overrides the attribute of the third persona, and
wherein projecting the first persona of the single textual identifier to the first identity while concurrently projecting the resolved attribute to the second identity comprises projecting the attribute of the second persona to the second identity.

84. The computer readable storage medium of claim 70 further comprising instructions for projecting the functionality of the first persona of the single textual identifier to the first of the identities while concurrently projecting the functionality of the second persona of the same single textual identifier to the second of the identities.

85. The computer readable storage medium of claim 84 further comprising instructions for selecting among the first and second personas for projection to a particular one of the identities based on an attribute of the particular identity.

86. The computer readable storage medium of claim 70 further comprising instructions for selecting functionality of the first persona based upon an attribute of the first identity.

87. The computer readable storage medium of claim 70 further comprising instructions for configuring the functionality of the first persona assigned to the first identity to change based upon the occurrence of a predetermined event.

88. A computer-implemented method comprising:
identifying, by a processor of the computer, at least two identities within an instant messaging communications environment to whom messages may be directed;
associating a first persona, a second persona, and a third persona with a single textual identifier of a user, the single textual identifier used to represent the user in the instant messaging communications environment;
associating a first persona of the single textual identifier with a first functionality;

associating a second persona of the single textual identifier with a second functionality, the second functionality differing from the first functionality;

associating a third persona of the single textual identifier with a third functionality, the third functionality differing from the first and second functionalities;

projecting, with a computer, the first persona of the single textual identifier to the first identity while concurrently projecting, with the computer, an amalgamation of the second persona and the third persona of the same single textual identifier to the second identity.

89. The method of claim 88 wherein projecting, with a computer, the first persona of the single textual identifier to the first identity while concurrently projecting, with the computer, an amalgamation of the second persona and the third persona of the same single textual identifier to the second identity comprises projecting a combination of the second persona and the third persona to the second identity.

90. The method of claim 88 wherein projecting, with a computer, the first persona of the single textual identifier to the first identity while concurrently projecting, with the computer, an amalgamation of the second persona and the third persona of the same single textual identifier to the second identity comprises projecting a selection of either the second persona or the third persona, but not both, to the second identity.

* * * * *